US011772990B2

(12) United States Patent
Al Hamouz et al.

(10) Patent No.: US 11,772,990 B2
(45) Date of Patent: Oct. 3, 2023

(54) REMOVAL OF CADMIUM IONS USING A TERPOLYMER/CARBON NANOTUBE COMPOSITE

(71) Applicant: King Fahd University of Petroleum and Minerals, Dhahran (SA)

(72) Inventors: Othman Charles Sadeq Al Hamouz, Dhahran (SA); Isaiah Olabisi Adelabu, Dhahran (SA); Tawfik Abdo Saleh Awadh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 194 days.

(21) Appl. No.: 15/957,383

(22) Filed: Apr. 19, 2018

(65) Prior Publication Data

US 2019/0322545 A1    Oct. 24, 2019

(51) Int. Cl.
*C02F 1/28* (2023.01)
*B01J 20/20* (2006.01)
*B01J 20/26* (2006.01)
*B01J 20/28* (2006.01)
*C02F 101/20* (2006.01)

(52) U.S. Cl.
CPC .............. *C02F 1/288* (2013.01); *B01J 20/205* (2013.01); *B01J 20/262* (2013.01); *B01J 20/28004* (2013.01); *C02F 1/283* (2013.01); *C02F 1/285* (2013.01); *C02F 2101/20* (2013.01)

(58) Field of Classification Search
CPC .......... C02F 1/283; C02F 1/285; C02F 1/288; C02F 2101/20; B01J 20/28004; B01J 20/205; B01J 20/262
See application file for complete search history.

(56) References Cited

U.S. PATENT DOCUMENTS

2005/0239927 A1   10/2005   Leggio et al.
2016/0058864 A1   3/2016    Meehan et al.

FOREIGN PATENT DOCUMENTS

| EP | 0 310 139 A2 | 4/1989 |
|---|---|---|
| EP | 0 542 370 A1 | 5/1993 |
| EP | 0 542 374 A1 | 5/1993 |
| EP | 1 595 903 A1 | 11/2005 |
| JP | 2004-315716 | 11/2004 |
| JP | 2014-53115 | 3/2014 |
| WO | 00/78898 A1 | 12/2000 |
| WO | 2012/153260 A1 | 11/2012 |

OTHER PUBLICATIONS

Hamouz et al., Journal of Environmental Management, vol. 192, pp. 163-170 (2017).*
Adelabu, "Synthesis of New Cross-Linked Melamine Based Polyamines Impregnated Carbon Nanotube Composites for Toxic Metal Ion Removal", Master's Thesis, King Fahd University of Petroleum & Minerals, Dhahran, Saudi Arabia (May 2016).*
Muhammad A. Albakri, et al., "New series of benzene-1,3,5-triamine based cross-linked polyamines and polyamine/CNT composites for lead ion removal from aqueous solutions", Chemical Engineering Journal, vol. 333, Feb. 1, 2018, pp. 76-84.
Dimitris Platis, et al., "Lock-and-key motif as a concept for designing affinity adsorbents for protein purification", Journal of Chromatography A, vol. 1128, Issues 1-2, Sep. 22, 2006, pp. 138-151.
Thanasis Dalakouras, et al., "Development of recombinant protein-based influenza vaccine: Expression and affinity purification of H1N1 influenza virus neuraminidase", Journal of Chromatography A, vol. 1136, Issue 1, Dec. 8, 2006, pp. 48-56.
Sherine N. Khattab, et al., "Design and synthesis of new s-triazine polymers and their application as nanoparticulate drug delivery systems", Journal of Chemistry, vol. 40, Issue 11, Sep. 27, 2016, pp. 9565-9578.
Othman Charles S. Al Hamouz, et al., "Novel cross-linked melamine based polyamine/CNT composites for lead ions removal", Journal of Environmental Management, vol. 192, May 1, 2017, pp. 163-170.

* cited by examiner

*Primary Examiner* — John Kim
(74) *Attorney, Agent, or Firm* — Oblon, McClelland, Maier & Neustadt, L.L.P.

(57) ABSTRACT

A method for removing cadmium ions from contaminated water sources and systems via contacting and treatment with composites formed from reaction between melamine, an aldehyde, diaminoalkane monomeric units and carbon nanotubes having activated carbonyl groups.

20 Claims, 13 Drawing Sheets

REMOVAL OF CADMIUM IONS USING A TERPOLYMER/CARBON NANOTUBE COMPOSITE

STATEMENT OF FUNDING ACKNOWLEDGEMENT

This project was funded by King Abdulaziz City for Science and Technology under project number AT-35-131 and King Fahd University of Petroleum and Minerals (KFUPM).

BACKGROUND OF THE INVENTION

Technical Field

The present disclosure relates to methods for the removal of cadmium ions from contaminated water sources and systems using a composite formed from a polycondensation reaction of melamine, an aldehyde, a diaminoalkane and carbon nanotubes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Heavy metals have a relativity high density of approximately 5 g per cubic centimeter and a high atomic weight. Over the past few years, significant efforts have been directed towards the mitigation of hazards associated with these toxic metal ions. Elevated levels of heavy metals are harmful to human health, aquatic organisms and the entire ecosystem due to their ability to bio-accumulate in vital body organs and interfere with metabolism. Heavy metals exposure also causes endocrine disruption, anemia, diarrhea, fever, human skin damage, stunted growth, apoptosis, and reduced chlorophyll generation in plants [Graeme Md K A, Pollack Jr MDFCV. Heavy Metal Toxicity, Part I: Arsenic and Mercury. The Journal of Emergency Medicine. 1998; 16(1):45-56; and Jaishankar M, Tseten T, Anbalagan N, Mathew B B, Beeregowda K N. Toxicity, mechanism and health effects of some heavy metals. Interdisciplinary Toxicology. 2014; 7(2):60-72]. Environmental heavy metals contamination is attributable to industrial activities such as metal refining, battery production, and chemical manufacturing that release toxic metal ions into the air, soil and water sources [Earnhart D. Water Pollution from Industrial Sources A2—Shogren, Jason F. Encyclopedia of Energy, Natural Resource, and Environmental Economics. Waltham: Elsevier; 2013. p. 114-120; Kossoff D, Hudson-Edwards K A, Howard A J, Knight D. Industrial mining heritage and the legacy of environmental pollution in the Derbyshire Derwent catchment: Quantifying contamination at a regional scale and developing integrated strategies for management of the wider historic environment. Journal of Archaeological Science: Reports. 2016; 6:190-199; Odabasi M, Tolunay D, Kara M, Ozgunerge Falay E, Tuna G, Altiok H, et al. Investigation of spatial and historical variations of air pollution around an industrial region using trace and macro elements in tree components. Science of The Total Environment. 2016; 550:1010-1021; Popescu F. A Performant State-of-Art Tool to Assess Cross-Border Impact of Industrial Activities. A Transboundary Air Pollution Case Study. Procedia Technology. 2016; 22:440-444; Shao X, Huang B, Zhao Y, Sun W, Gu Z, Qian W. Impacts of human activities and sampling strategies on soil heavy metal distribution in a rapidly developing region of China. Ecotoxicology and Environmental Safety. 2014; 104:1-8; and Sofer M, Potchter O, Gnaim N, Gnaim J M. Environmental nuisances from industrial activities in residential areas of Arab municipalities in Israel. Applied Geography. 2012; 35(1-2):353-362].

Cadmium ($Cd^{2+}$) is a particularly dangerous toxic metal because of its long half-life of approximately 9 to 35 years and its tendency to bio-accumulate in the human kidney, causing it to remain longer in the human body and cause severe disruption of normal metabolism and functioning [Arias M, Barral M T, Mejuto J C. Enhancement of copper and cadmium adsorption on kaolin by the presence of humic acids. Chemosphere. 2002; 48(10):1081-1088].

In view of the forgoing, one objective of the present disclosure is to provide a method for removal of cadmium ions from aqueous solutions by employing a carbon nanotube functionalized melamine-aldehyde-diaminoalkane terpolymer composite.

BRIEF SUMMARY OF THE INVENTION

According to a first aspect, the present disclosure relates to a method for removing cadmium ions from an aqueous solution. The method includes contacting the aqueous solution having an initial concentration of the cadmium ions with a composite to form a mixture, and filtering the mixture to obtain an aqueous solution having a reduced concentration of the cadmium ions compared to the initial concentration and a cadmium ion loaded composite, wherein the composite is a polycondensation product formed by a reaction of (i) melamine, (ii) an aldehyde of formula (I)

or a salt, solvate, or stereoisomer thereof, (iii) a diaminoalkane of formula (II)

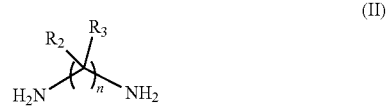

or a salt, solvate, tautomer or stereoisomer thereof, and (iv) carbon nanotubes comprising activated carbonyl groups, wherein $R_1$ is selected from the group consisting of a hydrogen, an optionally substituted alkyl, an optionally substituted cycloalkyl, and an optionally substituted aryl, $R_2$ is selected from the group consisting of a hydrogen, an optionally substituted alkyl, an optionally substituted cycloalkyl, an optionally substituted aryl, and an optionally substituted arylalkyl, $R_3$ is selected from the group consisting of a hydrogen, an optionally substituted alkyl, an optionally substituted cycloalkyl, an optionally substituted aryl, and an optionally substituted arylalkyl, n is a positive integer in the range of 4-16, and a weight percentage of the carbon nanotubes relative to a total weight of the composite is 0.01 wt % to 1.0 wt %.

In one embodiment, a molar ratio of the diaminoalkane of formula (II) to melamine is in the range of 1:1 to 5:1.

In one embodiment, a molar ratio of the aldehyde of formula (I) to melamine is in the range of 2:1 to 10:1.

In one embodiment, the activated carbonyl group is an acyl halide group.

In one embodiment, the carbon nanotubes are multi-walled carbon nanotubes.

In one embodiment, each $R_1$, $R_2$, and $R_3$ are a hydrogen, n is a positive integer in the range of 6-12, and the weight percentage of the carbon nanotubes relative to the total weight of the composite is 0.05 wt % to 0.2 wt %.

In one embodiment, n is 6.

In one embodiment, the composite has a particle size of 10-100 μm.

In one embodiment, the composite has a cadmium ion adsorption capacity in the range of 100-1,500 μg per g of the composite.

In one embodiment, the aqueous solution has a pH in the range of 2 to 7.

In one embodiment, the initial concentration of the cadmium ions in the aqueous solution ranges from 0.1 mg $L^{-1}$ to 100 mg $L^{-1}$.

In one embodiment, the composite is present at a concentration in the range of 0.1-10 g per liter of the aqueous solution during the contacting.

In one embodiment, the composite is contacted with the aqueous solution for 0.1-4 hours.

In one embodiment, the composite is contacted with the aqueous solution at a temperature in the range of 15° C. to 80° C.

In one embodiment, greater than 25% of a total mass of the cadmium ions is removed from the aqueous solution.

In one embodiment, the cadmium ion loaded composite comprises one or more cadmium ions coordinated to one or more nitrogen atoms.

In one embodiment, the cadmium ion loaded composite comprises one or more cadmium ions adsorbed onto the carbon nanotubes.

In one embodiment, the cadmium ion loaded composite has a particle size of 12-150 μm.

In one embodiment, each $R_1$, $R_2$, and $R_3$ are a hydrogen and n is 6, the composite is contacted with the aqueous solution at a temperature in the range of 45° C. to 65° C. for 1.5-2.5 hours, and the composite has a cadmium ion adsorption capacity greater than 1000 μg per g of the composite.

In one embodiment, n is in the range of 12-16.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
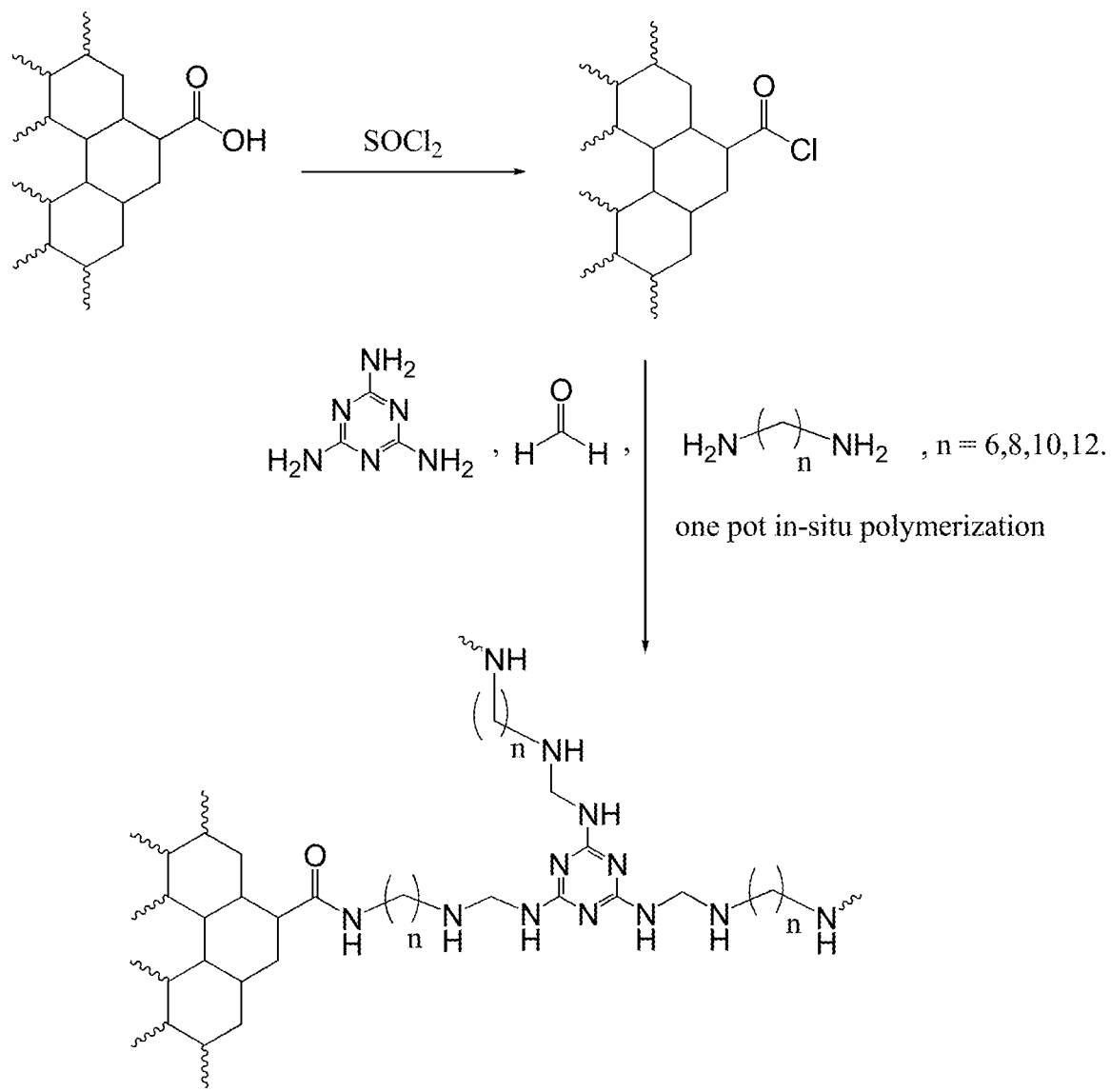
FIG. 1 is a synthetic process to form the composite wherein each $R_1$, $R_2$, and $R_3$ are a hydrogen, and n is 6, 8, 10 or 12.

Embodiments of the present disclosure will now be described more fully hereinafter with reference to the accompanying drawings, in which some, but not all embodiments of the disclosure are shown. The present disclosure will be better understood with reference to the following definitions.

Unless otherwise specified, "a" or "an" means "one or more". Within the description of this disclosure, where a numerical limit or range is stated, the endpoints are included unless stated otherwise. Also, all values and subranges within a numerical limit or range are specifically included as if explicitly written out.

As used herein, the term "compound" refers to a chemical entity, whether in a solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those skilled in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation around the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{14}N$ and $^{15}N$, and isotopes of oxygen include $^{17}O$ and $^{18}O$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, aubstituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

As used herein, the term "alkyl" unless otherwise specified refers to both branched and straight chain saturated aliphatic primary, secondary, and/or tertiary hydrocarbons of typically $C_1$ to $C_{16}$, preferably $C_2$ to $C_8$, and specifically includes, but is not limited to, methyl, trifluoromethyl, ethyl, n-propyl, isopropyl, n-butyl, sec-butyl, isobutyl, t-butyl, pentyl, isopentyl, neopentyl, hexyl, isohexyl, 3-methylpentyl, 2,2-dimethylbutyl, and 2,3-dimethylbutyl.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, halide, sulfonic acid, sulfate, phosphonic acid, phosphate or phosphonate or mixtures thereof. The substituted moiety may be either protected or unprotected as necessary, and as known to those skilled in the art.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

According to a first aspect, the present disclosure relates to a method for removing cadmium ions from an aqueous solution. The method includes contacting the aqueous solution having an initial concentration of the cadmium ions with a composite to form a mixture, and filtering the mixture to obtain an aqueous solution having a reduced concentration of the cadmium ions compared to the initial concentration and a cadmium ion loaded composite, wherein the composite is a polycondensation product formed by a reaction of (i) melamine, (ii) an aldehyde of formula (I)

(I)

or a salt, solvate, or stereoisomer thereof, (iii) a diaminoalkane of formula (II)

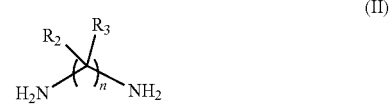

(II)

or a salt, solvate, tautomer or stereoisomer thereof, and (iv) carbon nanotubes comprising activated carbonyl groups, wherein $R_1$ is selected from the group consisting of a hydrogen, an optionally substituted alkyl, an optionally substituted cycloalkyl, and an optionally substituted aryl, $R_2$ is selected from the group consisting of a hydrogen, an optionally substituted alkyl, an optionally substituted cycloalkyl, an optionally substituted aryl, and an optionally substituted arylalkyl, $R_3$ is selected from the group consisting of a hydrogen, an optionally substituted alkyl, an optionally substituted cycloalkyl, an optionally substituted aryl, and an optionally substituted arylalkyl, n is a positive integer in the range of 4-16, and a weight percentage of the carbon nanotubes relative to a total weight of the composite is 0.01 wt % to 1.0 wt %.

As used herein, the value of n denotes an alkyl chain of —C($R_2$)($R_3$)— groups. In a preferred embodiment, n is a positive integer in the range of 4-16, preferably 5-14, preferably 6-12, preferably 8-10. In some embodiments, the adsorption of Cd(II) by the composite of the present disclosure in an aqueous solution increases as n goes from 4 to 6. In a more preferred embodiment, n is 6. As demonstrated by thermogravimetric analysis (TGA) in FIG. 6, thermal stability of the composite disclosed herein increases with an alkyl chain length "n" increase from 6 to 12. This is accompanied by an enhancement in crystallinity of the composite, as observed in FIG. 7. In one or more embodiments, n is a positive integer in the range of 12-16, 13-15, or n is 14. In certain embodiments, the alkyl chain may have more than 16 carbon atoms, e.g. 17, 18, 19, or 20 carbon atoms.

In a preferred embodiment, the weight percentage of the carbon nanotubes relative to a total weight of the composite is 0.01 wt % to 2.0 wt %, preferably 0.025 wt % to 1.5 wt %, preferably 0.05 wt % to 1.0 wt %, preferably 0.06 wt % to 0.8 wt %, preferably 0.07 wt % to 0.6 wt %, preferably 0.08 wt % to 0.4 wt %, preferably 0.09 wt % to 0.2 wt %, or about 0.1 wt %. In a preferred embodiment the weight percentage of the carbon nanotubes is relative to a total weight of the composite is 0.6 wt % to 1.0 wt %. In certain embodiments, the weight percentage of the carbon nanotubes relative to a total weight of the composite may be less than 0.01 wt % or greater than 7.0 wt %.

In a preferred embodiment, $R_1$ is selected from the group consisting of a hydrogen, an optionally substituted alkyl, an optionally substituted cycloalkyl, and an optionally substituted aryl, most preferably each $R_1$ is a hydrogen. In a preferred embodiment, $R_2$ is selected from the group consisting of a hydrogen, an optionally substituted alkyl, an optionally substituted cycloalkyl, an optionally substituted aryl, and an optionally substituted arylalkyl, most preferably each $R_2$ is a hydrogen. In a preferred embodiment, $R_3$ is selected from the group consisting of a hydrogen, an optionally substituted alkyl, an optionally substituted cycloalkyl, an optionally substituted aryl, and an optionally substituted arylalkyl, most preferably $R_3$ is a hydrogen.

In a preferred embodiment, each $R_1$, $R_2$, and $R_3$ are a hydrogen, n is a positive integer in the range of 6-12, and the weight percentage of the carbon nanotubes relative to the total weight of the composite is 0.05 wt % to 0.15 wt %, 0.075 wt % to 0.12 wt %, or about 0.1 wt %. In a more preferred embodiment, each $R_1$, $R_2$, and $R_3$ are a hydrogen, n is at least one selected from the group consisting of 6, 8, 10, and 12, and the weight percentage of the carbon nanotubes relative to the total weight of the composite is 0.05 wt % to 0.15 wt %, 0.075 wt % to 0.12 wt %, or about 0.1 wt %. In certain embodiments, each $R_1$, $R_2$, and $R_3$ are a hydrogen, n is a positive integer smaller than 6 or greater than 12 (e.g. 14, 16, 18, 20), and the weight percentage of the carbon nanotubes relative to the total weight of the composite is 0.05 wt % to 0.15 wt %, 0.075 wt % to 0.12 wt %, or about 0.1 wt %.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the individual components.

Carbon nanotubes (CNTs) are members of the fullerene family. The name refers to their long, hollow structure with the "walls" formed by one-atom-thick sheets of carbon, called graphene. These sheets are rolled at specific and discrete ("chiral") angles, and the combination of the rolling angle and radius determines the nanotube properties. Individual nanotubes naturally align themselves into "ropes" held together by van der Waals forces and pi-stacking. Nanotubes are categorized as single-walled carbon nanotubes (SWCNTs) and multi-walled carbon nanotubes (MWCNTs).

In a preferred embodiment, the composite of the present disclosure comprises carbon nanotubes which are multi-walled carbon nanotubes. Multi-walled nanotubes consist of multiple rolled layers (concentric tubes) of graphene. There are two models that can be used to describe the structures of multi-walled nanotubes. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper. The interlayer distance in multi-walled nanotubes is close to the distance between graphene layers in graphite. The Russian Doll structure is observed more commonly, its individual shells can be described as SWNTs. In certain embodiments, the composite of the present disclosure comprises carbon nanotubes which are single-walled carbon nanotubes. Single-walled nanotubes typically have a diameter of close to 1 nm and a tube length of up to many millions of times longer. The structure of a single-walled nanotube can be conceptualized by wrapping a one-atom-thick layer of graphite called graphene into a seamless cylinder. In practice, the way the graphene sheet is wrapped is represented by a pair of indices (x, y). The integers x and y denote the number of unit vectors along two directions in the honeycomb crystal lattice of graphene. If x=0, the nanotubes are called zigzag nanotubes, and if x=y, the nanotubes are called armchair nanotubes. Otherwise they are called chiral. In certain embodiments, the composite of the present disclosure comprises carbon nanotubes which are hybrid carbon nanotubes. Hybrid carbon nanotubes refer to hybrids of multi-walled carbon nanotubes and, for example, silica. They are designed to open the tubes of MWCNTs as a sheet instead of a tube.

In one embodiment, the composite of the present disclosure comprises substantially multi-walled carbon nanotubes. The weight ratio of MWCNTs to SWCNTs is preferably greater than 2:1, preferably greater than 5:1, preferably greater than 10:1, preferably greater than 15:1, preferably greater than 20:1, preferably greater than 25:1, preferably greater than 50:1, preferably greater than 75:1, and preferably greater than 100:1. In addition to single-walled carbon nanotubes and multi-walled carbon nanotubes it is envisaged that the present invention may be adapted to incorporate other types and related structures of carbon nanotubes including, but not limited to, a carbon nanotorus, a carbon nanobud, a 3D macroscopic carbon nanotube architecture, graphenated carbon nanotubes (g-CNTs), nitrogen-doped carbon nanotubes, a carbon peapod, cup-stacked carbon nanotubes, extreme carbon nanotubes and mixtures thereof.

In one or more embodiments, the composite of the current disclosure comprises carbon nanotubes with an average outer diameter of 10-200 nm, preferably 20-150 nm, preferably 25-125 nm, preferably 30-100 nm, preferably 35-80 nm, preferably 40-70 nm, preferably 45-60 nm, an average inner diameter of 5-150 nm, preferably 10-100 nm, preferably 20-60, preferably 25-50 nm, and an average length of 5 nm-100 μm, preferably 10 nm-50 μm, preferably 20 nm-40 μm, preferably 30 nm-30 μm, preferably 40 nm-20 preferably 50 nm-10 μm, preferably 60 nm-5 μm, preferably 70 nm-4 μm, preferably 80 nm-3 μm, preferably 90 nm-2 μm, preferably 100 nm-1 μm. In at least one embodiment, the carbon nanotubes used herein have a length-to-diameter ratio of up to 25:1, preferably up to 50:1, preferably up to 100:1, preferably up to 500:1, preferably up to 1,000:1, preferably up to 5,000:1, preferably up to 10,000:1.

In one embodiment, the composite described herein is derived from a polymeric network which is reinforced with surface functionalized and/or surface modified CNTs. These surface modifications may be covalent, non-covalent or mixtures thereof. As used herein, covalent functionalization is based on the formation of a covalent linkage between organic entities and the carbon skeleton of carbon nanotubes. It could also be divided into direct covalent sidewall functionalization and indirect covalent functionalization with carboxylic groups on the surface of carbon nanotubes. These carboxylic groups might have existed on the as-grown CNTs, and may be further generated through oxidative reactions. Alternatively, direct covalent sidewall functionalization is associated with a change in hybridization from $sp^2$ to spa and a simultaneous loss of conjugation. In terms of the present disclosure, the covalent functionalization takes advantage of chemical conversion of carboxylic groups to activated carbonyl groups on the surface of nanotubes in order to increase their reactivity. Exemplary activated carbonyl groups include, but are not limited to, acyl halides, carboxylic anhydrides. In a preferred embodiment, the activated carbonyl group is an acyl halide group, for example, an acyl chloride or acyl bromide group. Other carbonyl groups (e.g., carboxylic acids, esters, aldehydic, ketonic groups) may also be suitable to functionalize carbon nanotubes for the polycondensation reaction, although such groups may require in situ activation by amide coupling agents/catalysts such as peptide coupling agents (e.g., BOP reagent, benzotriazol-1-yl-oxytripyrrolidinophosphonium hexafluorophosphate, N,N'-diisopropylcarbodiimide, 4-(4, 6-dimethoxy-1,3,5-triazin-2-yl)-4-methyl-morpholinium chloride, 3-(diethoxyphosphoryloxy)-1,2,3-benzotriazin-4 (3H)-one, 1-[Bis(dimethylamino)methylene]-1H-1,2,3-triazolo[4,5-b]pyridinium 3-oxid hexafluorophosphate, 2-(1H-benzotriazol-1-yl)-1,1,3,3-tetramethyluronium hexafluorophosphate, 7-Azabenzotriazol-1-yloxy)tripyrrolidinophosphonium hexafluorophosphate). Alternatively, the carbon nanotubes of the present disclosure may be surface modified with alcoholic or amine functionalities.

In one embodiment, the carbon nanotubes of the present disclosure are "raw" or lacking any surface functionalization or modifications. Raw CNTs lacking any covalent functionalization can be modified non-covalently as well, which is mainly based on supramolecular complexation using various adsorption forces, such as van der Waals force, electrostatic force and pi-stacking interactions. Non-covalent functionalization has advantages that it could be operated under relatively mild reaction conditions and the graphitic structure of CNTs could be maintained. It is envisaged that the present disclosure may be adapted or chemically modified to incorporate CNTs in a polymeric network through a non-covalent functionalization.

As used herein the term "repeat unit" or "repeating unit" refers to a part of the polymer or resin whose repetition would produce the complete polymer chain (including or excluding the end groups) by linking the repeating units together successively along the chain. Monomers are molecules which can undergo polymerization, thereby contributing constitutional repeating units to the structures of a macromolecule or polymer. The process by which monomers combine end to end to form a polymer is referred to herein as "polymerization" or "polycondensation". As used herein a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

The polymeric network of the current disclosure is generally built on a melamine-based polyamine terpolymer which may be a polycondensation product of melamine, an aldehyde of formula (I) and a diaminoalkane of formula (II). In most embodiments, the melamine-based polyamine includes —NH— groups that readily form covalent linkages with activated carbonyl groups on the CNTs and/or the carbon atom originating from the carbonyl carbon atom of the aldehyde of formula (I). In one or more embodiments, the —NH— group participating in the aforementioned covalent linkage formation can originate from an amino group on either the diaminoalkane or the melamine moiety in the melamine-based polyamine.

In one embodiment, carbon nanotubes comprising activated carbonyl groups (e.g. acyl halides) may be prepared by reacting carboxylated carbon nanotubes with one or more thionyl halides to form carbon nanotubes having acyl halide groups. Carboxylated carbon nanotubes used herein may be commercially available from a variety of sources (e.g. Sigma Aldrich, Nanocyl Inc, and VWR International) or prepared in-house according to published methods known to one of ordinary skill in the art. For example, carboxylated carbon nanotubes may be prepared by dispersing CNTs in a concentrated acid, e.g. HF, $HNO_3$, $H_2SO_4$, $H_3PO_4$, $HClO_4$, and mixtures thereof, thereby forming a mixture. The mixture may be agitated and/or heated at 60° C. to 200° C., 80° C. to 160° C., 100° C. to 140° C., or at around 120° C. for 1-48 hours, 2-36 hours, 4-24 hours, or 6-12 hours to form a reaction mixture. Carboxylated carbon nanotubes may be collected from the reaction mixture and further purified using methods known to one skilled in the art. The extent of carboxyl functionalization is dependent upon a number of factors, e.g. the reactivity of CNTs, the reactivity of functionalizing agent, steric effect, etc. The extent of carboxyl functionalization is characterized by a percentage of the number of carboxyl functionalized carbon atoms relative the total number of carbon atoms in a CNT. In some embodiments, a percentage of carboxyl functionalization is in the range of 0.1-30%, preferably 1-20%, preferably 5-15% of carboxyl functionalized carbon atoms relative to the total number of carbon atom in the CNT described herein. The extent of carboxyl functionalization may be determined by various analytical tools including, but not limited to, scanning tunneling microscopy (SEM), atomic force microscopy (AFM), X-ray photoelectron spectroscopy (XPS), XRD, Raman spectroscopy, $^{13}C$-NMR spectroscopy, IR spectroscopy, and acid-base titration.

In one or more embodiments, carbon nanotubes with acyl halide groups can be prepared by reacting the carboxylated carbon nanotubes in the presence of a thionyl halide such as thionyl chloride and thionyl bromide at 25° C. to 100° C., 35° C. to 95° C., 45° C. to 85° C., or 55° C. to 75° C. In a preferred embodiment, the thionyl halide is present in a molar excess to the carboxylated carbon nanotubes. In one embodiment, the molar ratio of the thionyl halide to the carboxylated carbon nanotubes is 2:1 to 1,000:1, 3:1 to 750:1, 4:1 to 500:1, 5:1 to 100:1, 6:1 to 50:1, 7:1 to 25:1, 8:1 to 15:1, or 10:1 to 12:1.

In a preferred embodiment, reacting the carbon nanotubes with acyl halide groups with the diaminoalkane in the presence of the aldehyde and melamine to form the composite is performed in a polar solvent under agitation, preferably in dimethylformamide (DMF) at 50-130° C., preferably 60-120° C., preferably 80-100° C., or about 90° C. for 4-48 hours, 8-40 hours, 12-36 hours, 18-30 hours, or about 24 hours. Exemplary additional polar solvents that may be used in addition to, or in lieu of DMF include, but are not limited to, tetrahydrofuran, ethyl acetate, acetone, acetonitrile, dimethyl sulfoxide, nitromethane and propylene carbonate, methanol, n-butanol, isopropanol, n-propanol, ethanol, or mixtures thereof. It is equally envisaged that the reaction may be adapted to be performed in a non-polar solvent (i.e. pentane, cyclopentane, hexane, cyclohexane, benzene, toluene, 1,4-dioxane, chloroform, diethyl ether, dichloromethane, and mixtures thereof). In a preferred embodiment, the reaction is performed at a concentration of melamine in the range of 0.01-10.0 M, preferably 0.05-5.0 M, preferably 0.10-2.0 M, preferably 0.20-1.0 M, preferably 0.3-0.5 M. In a preferred embodiment, the composite is collected as a resinous material that may be separated (filtered off), crushed, soaked and washed in DMF, water and acetone, and then filtered and dried. In one embodiment, the resinous material may be dried under vacuum at 20-100° C., preferably 40-80° C., or about 60° C. until a constant weight is achieved. In a preferred embodiment, the reaction of forming the composite has a product yield of at least 50%, preferably at least 60%, preferably at least 65%, preferably at least 70%, preferably at least 75%, preferably at least 80%, preferably at least 85%, preferably at least 90%. The product yield is calculated as (mass of product/total mass of reactants)×100%.

In a preferred embodiment, the diaminoalkane of formula (II) is present in a molar excess to melamine. In one embodiment, the molar ratio of the diaminoalkane of formula (II) to melamine is in the range of 1:1 to 5:1, preferably 1.5:1 to 4.5:1, preferably 2:1 to 4:1, preferably 2.5:1 to 3.5:1, or about 3:1. In a preferred embodiment, the aldehyde of formula (i) is present in a molar excess to melamine. In one embodiment, the molar ratio of the aldehyde to melamine is in the range of 2:1 to 10:1, preferably 3:1 to 9:1, preferably 4:1 to 8:1, preferably 5:1 to 7:1, or about 6:1.

A particle is defined as a small object that behaves as a whole unit with respect to its transport and properties. The composite of the present disclosure in any of its embodiments may be in the form of particles of the same shape or different shapes, and of the same size or different sizes. An average diameter (e.g., average particle diameter) of the particle, as used herein, refers to the average linear distance measured from one point on the particle through the center of the particle to a point directly across from it. In a preferred embodiment, the composite has a particle size of 5-150 μm, preferably 10-100 μm, preferably 15-75 μm, preferably 20-50 μm. In one embodiment, the composite may be clustered together as agglomerates having an average diameter in a range of 20-1500 μm, 50-1000 μm, or 100-500 nm. As used herein, the term "agglomerates" refers to a clustered particulate composition comprising primary particles, the primary particles being aggregated together in such a way so as to form clusters thereof, with at least 50 volume percent of the clusters having a mean diameter that is at least 2 times the mean diameter of the primary particles, and preferably at least 90 volume percent of the clusters having a mean diameter that is at least 5 times the mean diameter of the primary particles. In a preferred embodiment, the particles are well separated from one another and do not form agglomerates. The size and shape of particles may be analyzed by techniques such as dynamic light scattering (DLS), scanning electron microscopy (SEM) and/or atomic force microscopy (AFM).

A polymer may be loosely described as crystalline if it contains regions of three-dimensional ordering on atomic (rather than macromolecular) length scales, usually arising from intramolecular folding and/or stacking of adjacent chains. A degree of crystallinity may be expressed in terms of a weight fraction of volume fraction of crystalline material. The crystallinity of polymers may be characterized by their degree of crystallinity, ranging from zero for a completely amorphous (non-crystalline) polymer to one for a theoretical completely crystalline polymer. The composite described herein may be crystalline, semi-crystalline, or amorphous. In certain embodiment, the composite described herein may contain both crystalline and amorphous regions. Methods for evaluating the degree of crystallinity include, but are not limited to differential scanning calorimetry (DSC), X-ray diffraction (XRD), infrared (IR) spectroscopy, and nuclear magnetic resonance (NMR) spectroscopy. The distribution of crystalline and amorphous regions of a polymer may be further visualized with microscopic techniques, such as polarized light microscopy and transmission electron microscopy (TEM).

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing cadmium ions from aqueous solutions according to the present disclosure include contacting the composite of the present disclosure in any of its embodiments with cadmium ion contaminated water sources and systems. The methods may be carried out in tanks, containers, or small scale applications in both batch mode and fixed-bed or column mode.

As used herein, a ligand refers to in inorganic chemistry an ion or molecule (functional group) that coordinates a metal atom to form a coordination complex. The binding between metal and ligand generally involves formal donation of one or more of the ligand's electron pairs. The nature of the metal-ligand bonding can range from covalent to ionic and the metal-ligand bond order can range from one to three. Ligands are classified in many ways including, but not limited to, size (bulk), the identity of the coordinating atom(s), and the number of electrons donated to the metal (i.e. denticity or hapticity). Denticity refers to the number of times a ligand bonds to a metal through noncontiguous donor sites. Many ligands are capable of binding metal ions through multiple sites, usually because the ligands have lone pairs on more than one atom. A ligand that binds through one site is classified as monodentate, a ligand that binds through two sites is classified as bidentate, three sites as tridentate, and more than one site as polydentate. Ligands that bind via more than one atom are often termed chelating. Complexes of polydentate ligands are called chelate complexes. As used herein, chelation is a particular type of way ions and molecules bind to metal ions. It involves the formation or presence of two or more coordinate bonds between a polydentate (multiple bonded) ligand and a single central atom. These ligands are often organic compounds and may be referred to as chelants, chelators, chelating agents, or sequestering agents. The chelate effect describes the enhanced affinity of chelating ligands for a metal ion compared to the affinity of a collection of similar non-chelating (i.e. monodentate) ligands for the same metal. In terms of the present disclosure, the composite may adsorb or bind with one or more cadmium ions by coordinating the cadmium ion at a site, e.g., a —NH moiety through monodentate coordination, or polydentate chelation including, but not limited to bidentate chelation or tridentate chelation to the cadmium ion to form a cadmium ion loaded composite.

Cadmium is a heavy metal with an atomic mass of 112. It usually has an oxidation state of +2, with outer electron configuration of $4d^{10}$. While lead exists in either a divalent or tetravalent state, cadmium is generally a divalent metal. Cadmium has an electronegativity of 1.69, which is smaller than the 1.87 electronegativity of lead. Cadmium has an ionic radius of 158 pm, which is smaller than the 202 pm ionic radius of lead. Unexpectedly, it was found that the composites disclosed herein with longer alkyl chain lengths (n=6-16) are best suited for removal of cadmium ions from aqueous solution, while composites with shorter chain lengths (n=2-12) more efficiently remove lead ions [application Ser. No. 15/887,792—incorporated herein by reference]. Given that cadmium ions are smaller than lead, one may hypothesize that even shorter chain lengths (e.g. n=2-5) are suitable for cadmium removal, however this was not observed. Composites with longer alkyl chains (e.g. n=6-16) have more compact structures (Example 5) and may thereby promote more efficient agglomeration and/or aggregation for ions of smaller size, thus increasing their adsorption capacity for cadmium. As a group IIB d-block metal, Cd(II) ions have some soft character and form stable complexes with soft donor atoms such as sulfur and nitrogen. Because of its acute and chronic toxicity, efforts have been made to explore viable and efficient technologies for the removal of cadmium ions from contaminated water bodies and drinking water. Approaches tested recently include ion flotation and exchange [Polat H, Erdogan D. Heavy metal removal from waste waters by ion flotation. Journal of Hazardous Materials. 2007; 118(1-2):267-273], reverse osmosis [Lee K P, Arnot T C, Mattia D. A review of reverse osmosis membrane materials for desalination-Development to date and future potential. Journal of Membrane Science. 2011; 370(1-2): 1-22], chemical treatment and precipitation [V. K Gupta I A, T. A. Saleh, A. Nayak, S. Agarwal. Chemical treatment technologies for waste water recycling—an overview. RSC Advances. 2012; 2(16)], solvent extraction, electrochemical treatment [Ling C, Liu F-Q, Long C, Chen T-P, Wu Q-Y, Li A-M. Synergic removal and sequential recovery of acid black 1 and copper (II) with hypercrosslinked resin and inside mechanisms. Chemical Engineering Journal. 2014; 236:323-331; and Ludwig R. Extraction of Metals from Soils and Waters. Edited by D. Max Roundhill. Angew Chem Int Ed. 2002; 41(14):2611-2613] and adsorption [Ihsanullah, Al-Khaldi F A, Abusharkh B, Khaled. M, Atieh M A, Nasser M S, et al. Adsorptive removal of cadmium(II) ions from liquid phase using acid modified carbon-based adsorbents. Journal of Molecular Liquids. 2015; 204:255-263; Huang J-H, Huang K-L, Liu S-Q, Wang A T, Yan C. Adsorption of Rhodamine B and methyl orange on a hypercrosslinked polymeric adsorbent in aqueous solution. Colloids and Surfaces A: Physicochemical and Engineering Aspects. 2008; 330(0:55-61; Nadeem R, Manzoor Q, Iqbal M, Nisar J. Biosorption of Pb(II) onto immobilized and native *Mangifera indica* waste biomass. Journal of Industrial and Engineering Chemistry. 2016; 35:185-194; Pandey P K, Verma Y, Choubey S, Pandey M, Chandrasekhar K. Biosorptive removal of cadmium from contaminated groundwater and industrial effluents. Bioresource Technology. 2008; 99(10):4420-4427; Wang J, Chen C. Biosorbents for heavy metals removal and their future, Biotechnology Advances. 2009; 27(2): 195-226]. Among these heavy metal removal technologies, adsorption involving the use of polymers, membranes, resins, activated carbon, fly ash and other nanomaterials has proven to be one of the best options because of its efficiency, low cost, ease of modification, and reusability without losing sorption capability after regeneration [Fu F, Wang Q. Removal of heavy metal ions from wastewaters: A review. J Environ Manage. 2011; 92(3):407-418; Wang S, Wang K, Dai C, Shi H, Li J. Adsorption of $Pb^{2+}$ on amino-functionalized core-shell magnetic mesoporous SBA-15 silica composite. Chemical Engineering Journal. 2015; 262:897-903; Alhwaige A A, Alhassan S M, Katsiotis M S, Ishida H, Qutubuddin S. Interactions, morphology and thermal stability of graphene-oxide reinforced polymer aerogels derived from star-like telechelic aldehyde-terminal benzoxazine resin. RSC Advances. 2015; 5(112): 92719-92731; Baraka A, Hall P J, Heslop M J. Preparation and characterization of melamine-formaldehyde-DTP A chelating resin and its use as an adsorbent for heavy metals removal from wastewater. Reactive and Functional Polymers. 2007; 67(7):585-600; Cheong I W, Shin J S, Kim M I Lee S J. Preparation of monodisperse melamine-formaldehyde microspheres via dispersed polycondensation. Macromolecular Research. 2004; 12(2):225-232; Ming G, Duan H, Meng X, Sun G, Sun W, Liu Y, et al. A novel fabrication of monodisperse melamine-formaldehyde resin microspheres to adsorb lead(II). Chemical Engineering Journal. 2016; 288:745-757; Girgis B S, El-Sherif I Y, Attia A A, Fathy N A Textural and adsorption characteristics of carbon xerogel adsorbents for removal of Cu(II) ions from aqueous solution. Journal of Non-Crystalline Solids. 2012; 358(4): 741-747; H. Y. Yang Z J H, S. F. Yu, K. L. Pey, K. Ostrikov, R. Kamik. Carbon nanotubes for water desalination and purification. Nat Commun. 2013; 4; and Yang Z, Cao Z, Sun H, Li Y. Composite Films Based on Aligned Carbon Nanotube Arrays and a Poly(NIsopropyl Acrylamide) Hydrogel. Advanced Materials. 2008; 20(10:2201-2205]. Despite these recent advances, cadmium remains a relatively understudied target for adsorption materials compared to other heavy metals such as lead and mercury.

As used herein, adsorption is the adhesion of atoms, ions or molecules from a gas, liquid, or dissolved solid to a surface. The process creates a film of an adsorbate (i.e. cadmium ions) on the surface of an adsorbent (i.e. the composite). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof. In at least one embodiment, the heavy metal ion is removed by physisorption with the composite of the current disclosure, meaning the process is primarily physical and preferably no chemical changes occur on the composite or the metal ion.

Carbon nanotubes exhibit strong adsorption affinities to a wide range of contaminants including heavy metals in water. The large adsorption capacity of CNTs for cadmium ions is primarily due to their concentrated pore distributions and large surface areas. They show similar adsorption capacities as activated carbons in the presence of natural organic matter. Furthermore, CNTs exhibit good mechanical properties and chemical stabilities even under extreme conditions (e.g., high temperature and strong acidic or basic conditions). Embedding CNTs in a polymeric network through covalent functionalization helps CNTs dispersing in an aqueous environment, and provide thermal stability and mechanical durability to the resulting composite. In one embodiment, cadmium ions are adsorbed onto a surface of the composite during the contacting, whereby the cadmium ions adhere to a surface of the carbon nanotubes. In a preferred embodiment, the cadmium ion loaded composite comprises one or more cadmium ions adsorbed onto the carbon nanotubes.

The performance of an adsorbent material, polymers inclusive, is largely dependent on the type of functionality it carries. The presence of chelating functionalities such as amine, carbonyl and thiol moieties is known to enhance the performance of materials towards the removal of heavy metal ions from aqueous solutions. These moieties have a known ability to form strong complexes/chelates with heavy metal ions. In general nitrogen-containing compounds exhibit a significant affinity towards cadmium ions. The polymeric network of the current disclosure built on a melamine-based polyamine terpolymer preferably features at least one nitrogen atoms, preferably a plurality of nitrogen atoms present in the same repeating unit. In one embodiment, each repeating unit in the melamine-based polyamine terpolymer includes multiple chelating centers (e.g. —NH, melamine nitrogen atoms) to which one or more cadmium ions can be coordinated. In a preferred embodiment, the cadmium ion loaded composite comprises one or more cadmium ions coordinated to one or more nitrogen atoms.

In one embodiment, the cadmium ion loaded composite of the present disclosure in any of its embodiments may be in the form of particles of the same shape or different shapes, and of the same size or different sizes. In one or more embodiments, the average particle size of the cadmium ion loaded composite may be greater than that of the composite by about 10% to about 200%, about 20% to about 150%, about 30% to about 100%, or about 50% to about 75%. In one embodiment, the cadmium ion loaded composite has a particle size of 11-300 μm, preferably 12-200 μm, preferably 15-150 μm, preferably 30-100 μm, preferably 50-75 μm. In one embodiment, the cadmium ion loaded composite may be clustered together as agglomerates having an average diameter in a range of 30-5000 μm, 100-2500 μm, or 200-1500 μm.

In one or more embodiments, the composite of the present invention has a cadmium ion adsorption capacity of at least 50 μg per gram of the composite, preferably at least 100 μg $g^{-1}$, preferably at least 500 μg $g^{-1}$, preferably at least 750 μg $g^{-1}$, preferably at least 1000 μg $g^{-1}$, preferably at least 1250 μg of cadmium ion per gram of the composite. In a preferred embodiment, the composite has a cadmium ion adsorption capacity in the range of 100-2000 μg per gram of the composite, preferably 250-1500 μg $g^{-1}$, preferably 450-1100 μg $g^{-1}$, preferably 600-850 μg per gram of the composite.

In one or more embodiments, the method for removing cadmium ions is carried out in an aqueous solution having a pH in the range of 1 to 7, preferably a pH in the range of 2 to 6, more preferably a pH in the range of 3 to 5.

In a preferred embodiment, the composite is effective in removing cadmium ion from aqueous samples wherein the initial concentration of the cadmium ion in the aqueous solution is in the range of 0.01-500 mg $L^{-1}$, preferably 0.1-400 mg $L^{-1}$, preferably 1-300 mg $L^{-1}$, preferably 2.5-200 mg $L^{-1}$, preferably 5-100 mg $L^{-1}$, preferably 10-50 mg $L^{-1}$.

In one or more embodiments, the composite of the current disclosure is present in the aqueous solution at a concentration in the range of 0.01-25 grams per liter of the aqueous solution during the contacting, preferably 0.1-20 g $L^{-1}$, preferably 0.5-10 g $L^{-1}$, preferably 1-5 g $L^{-1}$, or about 1.5 grams per liter of the aqueous solution during the contacting.

In a preferred embodiment, the composite of the present disclosure is contacted with the aqueous solution for 0.1 to 24 hours, preferably 0.2-12 hours, preferably 0.25-10 hours, preferably 0.5-8 hours, preferably 0.75-6 hours, preferably 1-4 hours, preferably 2-3 hours.

In one or more embodiments, the composite of the present invention is effective in adsorbing heavy metal ions in an aqueous solution within a temperature range of 10-100° C., preferably 15-90° C., preferably 20-80° C., preferably 25-70° C. In a preferred embodiment, the composite is contacted with the aqueous solution at a temperature in the range of 18-85° C., preferably 27-65° C., preferably 40-55° C. Within the effective temperature range, increasing the temperature may increase the removal of cadmium ions.

In one or more embodiments, greater than 25% of a total mass of the cadmium ions is removed from the aqueous solution at the end of the adsorption process following contacting, preferably greater than 30%, preferably greater than 40%, preferably greater than 50%, preferably greater than 60%, preferably greater than 70%, preferably greater than 80%, preferably greater than 90%, preferably greater than 92%, preferably greater than 94%, preferably greater than 96%, preferably greater than 97%, preferably greater than 98%, preferably greater than 99% of a total mass of the cadmium ions is removed from the aqueous solution at the end of the adsorption process following contacting.

In one or more embodiments, the adsorption of Cd(II) by the composite of the present disclosure in an aqueous solution increases as the alkyl chain length of diaminoalkane "n" goes from 2 to 6. In a preferred embodiment, each $R_1$, $R_2$, and $R_3$ are a hydrogen and n is 6, the composite is contacted with the aqueous solution at a temperature in the range of 45° C. to 65° C. for 1.5-2.5 hours, and the composite has a cadmium ion adsorption capacity greater than 1000 μg per g, preferably greater than 1100 μg per g, preferably greater than 1200 μg per g, preferably greater than 1300 μg per g, preferably greater than 1400 μg per g, preferably greater than 1500 μg per g of the composite.

Adsorption is a key mechanism of removing cadmium ions in the present disclosure, which requires contact between the adsorbent material (composite) and the target adsorbate (cadmium ions). There is generally an increase in the removal efficiency with increasing agitation speed until a certain level. In one or more embodiments, the method further comprises agitation of the aqueous solution during the contacting. In certain embodiments, the method comprises agitation of the aqueous solution before, during or after the contacting. The agitation may encompass shaking, stirring, rotating, vibrating, sonication and other means of increasing contact between the composite of the current disclosure and cadmium ions. Further, the agitation can be performed manually or mechanically. In one embodiment, the treatment and contacting process may be enhanced by mechanical shaking or agitation, preferably by a bath shaker at a speed of up to 1500 rpm, preferably up to 1000 rpm, preferably up to 750 rpm, preferably 100-500 rpm, preferably 150-400 rpm, preferably 200-300 rpm in order to increase contact between the composite and cadmium ions.

The examples below are intended to further illustrate procedures for preparing and characterizing the composites used in the present invention, and assessing the method for cadmium ion removal using these composites. They are not intended to limit the scope of the claims.

Example 1

Materials and Methods

Melamine, diaminoalkanes, and paraformaldehyde were purchased from Fluka Chemie AG (Buchs, Switzerland). N, N-dimethylformamide (DMF) was supplied by Sigma Aldrich (Germany). All other solvents and reagents employed were of analytical grade. FT-IR spectra of the composites were analyzed on a Perkin Elmer 16F PC FT-IR spectrometer within 4000-500 $cm^{-1}$ wavenumber region. Solid-state $^{13}C$-NMR spectra were taken using a Bruker WB-400 spectrometer with a spinning rate of 10 KHz. Elemental analysis was done on a Perkin-Elmer Elemental Analyzer series II Model 2400. Powder X-ray diffraction pattern of crystal nature was recorded using a Rigaku Miniflex II Desktop X-ray Diffractometer with 3° and stop angle of 70°, sampling step size of 0.03, scan speed of 3.00, 30 KV and 15 mA. Inductively Coupled Plasma Mass Spectroscopy (ICP-M S) analyses of wastewater before and after treatment with composites were done using an ICP-M S X Series-II (Thermo Scientific).

Example 2

Mechanistic Studies on the Synthesis of Melamine Based Polyamines

Figure 2A:
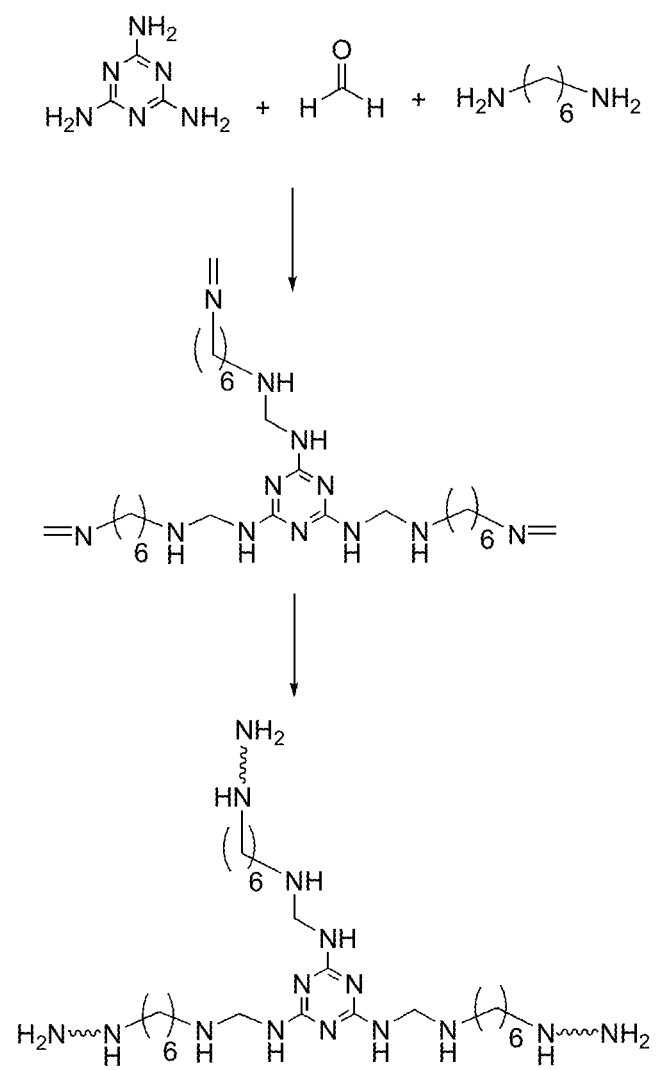
FIG. 2A depicts the mechanism of polycondensation of melamine, paraformaldehyde and a 1,6-diaminohexane.
Figure 2B:
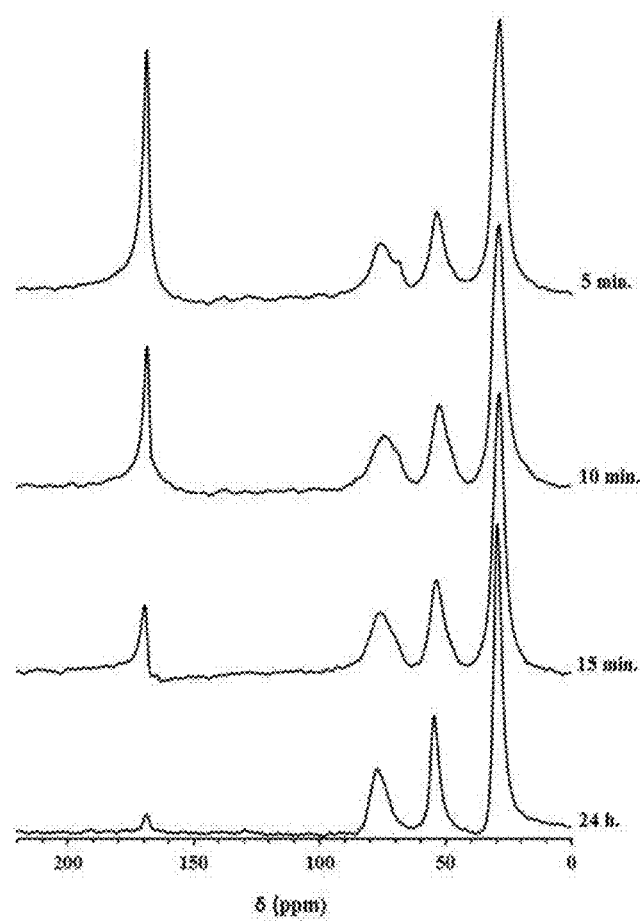
FIG. 2B is an overlay of solid-state $^{13}C$ nuclear magnetic resonance (NMR) spectra of polycondensation products of melamine, paraformaldehyde and a 1,6-diaminohexane collected at different reaction time intervals.

The polymerization reaction mechanism was studied by following solid $^{13}C$-NMR change with time (FIG. 2B). In an exemplary experiment, 20 mL DMF was added to a mixture of melamine, 1,6-hexadiamine and paraformaldehyde at a molar ratio of 1:3:6. The reaction was purged with nitrogen, sealed and then stirred at 90° C. for 24 hours. The experiment was quenched by methanol and sample was collected from the reaction at different time intervals in order to study the mechanism of the polymerization reaction. The sample was then washed and filtered several times and then dried to constant weight under vacuum at 60° C.

Example 3

Results and Discussion: Mechanistic Studies

The polycondensation reaction of the cross-linked polyamines was studied by following solid $^{13}C$-NMR with time in order to grasp the mechanism of the reaction of melamine, formaldehyde and 1,6-diaminohexane (FIGS. 2A and 2B). It was noticed that a solid was formed within 5 minutes during the reaction. Samples of the reaction were extracted, filtered, washed with methanol, and then dried till a constant weight was reached. Strong intensities of —C═N— bond at ~165 ppm observed in the spectra of FIG. 2 revealed the formation of imines by reacting 1,6-diaminohexane with formaldehyde [Lin Y, Yan Q, Kong C, Chen L. Polyethyleneimine incorporated metal-organic frameworks adsorbent for highly selective $CO_2$ capture. Scientific Reports. 2013; 3:1859]. As reaction time increased, the imine bond intensity decreased due to connection of oligomeric units which led to cross-linked polyamine formation. The spectra also reveal the presence of melamine moiety demonstrated by the peak at ~165 ppm, which persisted 24 hours after the start of reaction. This observation proved the presence of melamine in the cross-linked polyamine.

Example 4

Synthesis of Polyamine/CNT Composites

Active chlorinated CNT was synthesized by reacting acidified CNT with thionyl chloride prior to the synthesis of the functionalized polyamine/CNT composites. The polymer/CNT composites were prepared by an in-situ polycondensation reaction of 0.1% chlorinated CNT with melamine, an alkyldiamine [1,6-hexadiamine (CMA1), 1,8-octadiamine (CMA2), 1,10-decadiamine (CMA3), or 1,12-dodecadiamine (CMA4)] and paraformaldehyde at a molar equivalent ratio of 1:3:6 in DMF for 24 hrs at a temperature of 90° C. (FIG. 1). Once the reaction completed the product was washed with methanol and dried under vacuum at 60° C. till a constant weight was reached. Reaction yields of the polymerization are presented in Table 1.

TABLE 1

Condensation polymerization reaction of 0.1% chlorinated CNT, melamine, paraformaldehyde, alkyldiamine.*

| Polymer | Yield % |
|---|---|
| CMA 1 | 69.3 |
| CMA 2 | 67.3 |
| CMA 3 | 72.1 |
| CMA 4 | 68.4 |

*All reactions were conducted under nitrogen in 20 mL DMF at 90° C. for 24 hrs. The molar ratio was 0.01 mol melamine: 0.03 mol alkyldiamine: 0.06 mol paraformaldehyde.

Example 5

Synthesis and Characterization of Melamine Based Polyamine/CNT Composites (CMAs)

Figure 3:
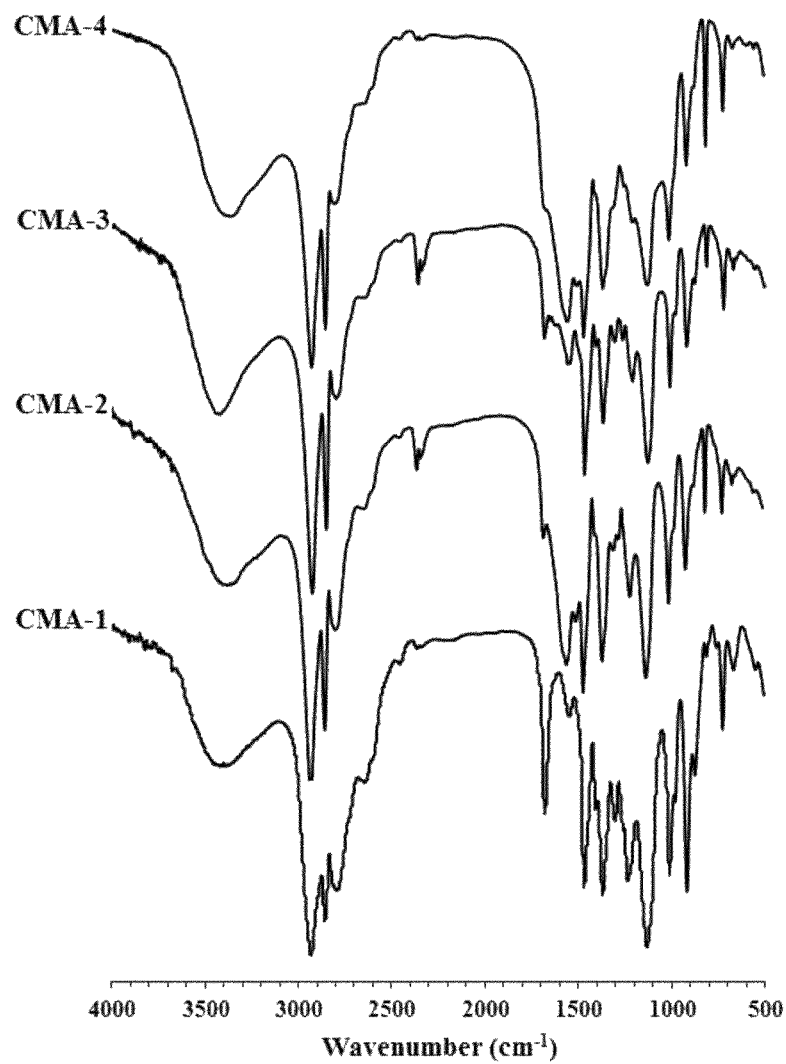
FIG. 3 is an overlay of Fourier transform infrared (FT-IR) spectra of the composites wherein each $R_1$, $R_2$, and $R_3$ are a hydrogen, the weight percentage of the carbon nanotubes relative to the total weight of the composite is 0.1%, and n is 6 (CMA-1), 8 (CMA-2), 10 (CMA-3), and 12 (CMA-4).

The consistency of the structure predicted by the reaction scheme is shown by the FTIR spectra in FIG. 3. The absorption peaks around ~3450 $cm^{-1}$ and ~3200 $cm^{-1}$ are attributed to the stretching vibrations of —$NH_2$ and —NH— groups. Sharp stretching bands at ~1695 $cm^{-1}$ and ~1472 $cm^{-1}$ reflect the stretching vibrations of triazine ring of the melamine moiety (—C═N—). Intense peaks at ~1585 $cm^{-1}$ and ~1326 $cm^{-1}$ are characteristic peaks of carbon nanotubes and an indication that the polymer was completely functionalized by the carbon nanotubes. —N—H wag vibration is represented by the band at ~760 $cm^{-1}$, while the sharp peak at ~720 $cm^{-1}$ indicates the —$CH_2$— aliphatic chains of the polymer composite. Also, highly pronounced sharp peaks at ~2905 $cm^{-1}$ and ~2850 $cm^{-1}$ can be assigned to the C—H symmetrical stretching of the diaminoalkane, increasing in intensity as the aliphatic chain length increases [Akintola O S, Saleh T A, Khaled M M, Al Hamouz O C S. Removal of mercury (II) via a novel series of cross-linked polydithiocarbamates. Journal of the Taiwan Institute of Chemical Engineers. 2016; 60:602-616; and Chi K-W, Ahn Y S, Shim K T, Park T H, Ahn J S. One-pot synthesis of Mannich base using hydroxy aromatic rings and secondary amines. Bull Korean Chem Soc. 1999; 20(8):973-976].

Figure 4:
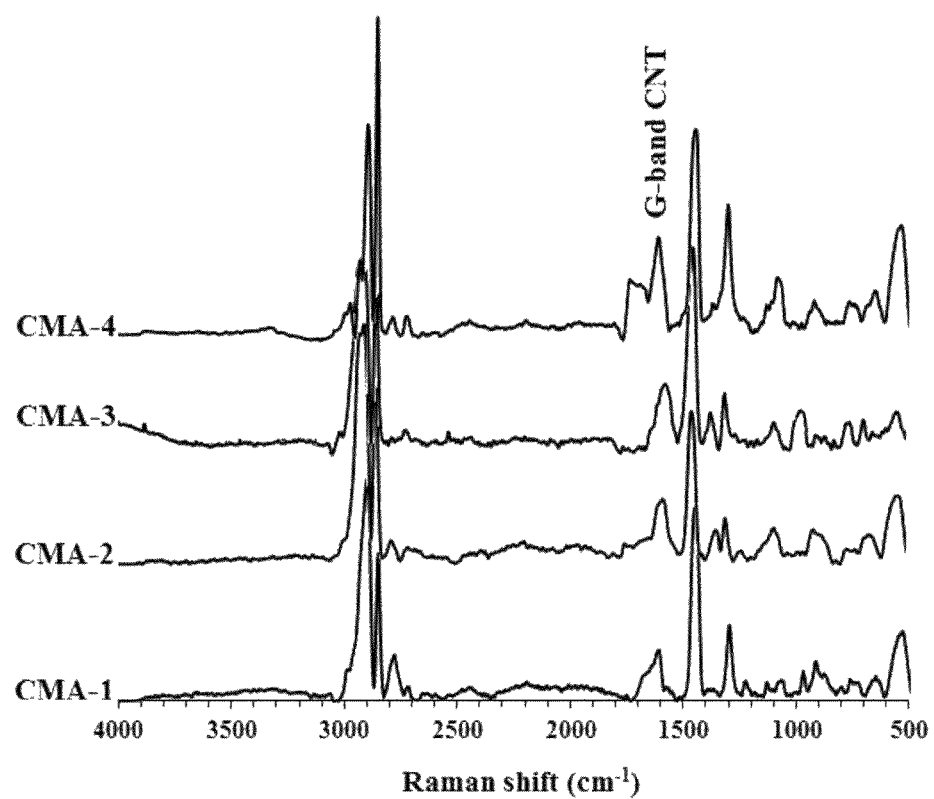
FIG. 4 is an overlay of Raman spectra of the composites wherein each $R_1$, $R_2$, and $R_3$ are a hydrogen, the weight percentage of the carbon nanotubes relative to the total weight of the composite is 0.1%, and n is 6 (CMA-1), 8 (CMA-2), 10 (CMA-3), and 12 (CMA-4).

Raman scattering spectra of the synthesized polymer/CNT composites are shown in FIG. 4. A peak at ~1600 $cm^{-1}$ which is attributed to the G-band of the CNT was observed in the spectra of CMA1, CMA2, CMA3 and CMA4 samples. The similar intensity of the G-band in all samples demonstrates the incorporation of the CNT in polymers at similar ratios [Mobasherpour I, Salahi E, Ebrahimi M. Thermodynamics and kinetics of adsorption of Cu(II) from aqueous solutions onto multi-walled carbon nanotubes. Journal of Saudi Chemical Society. 2014; 18(6):792-801].

Figure 5:
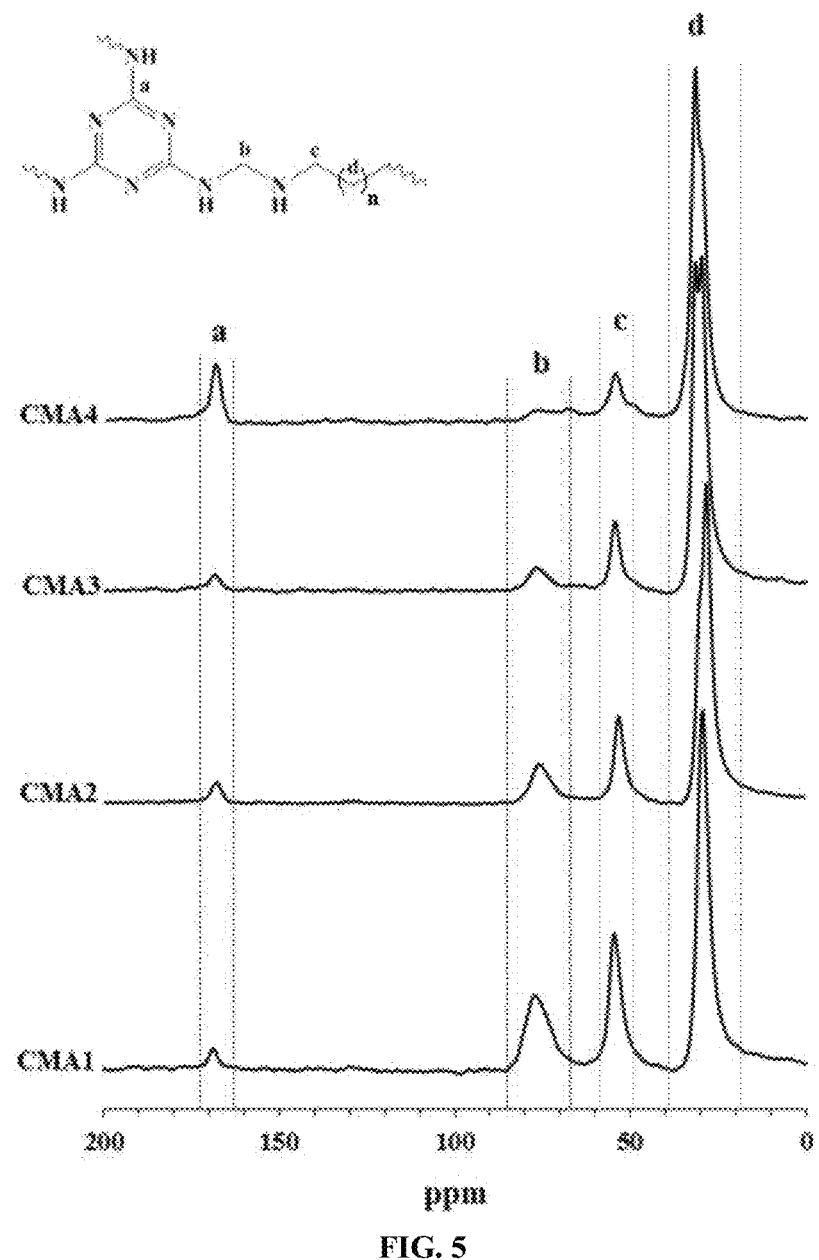
FIG. 5 is an overlay of solid-state $^{13}C$ cross polarization magic-angle spinning (CPMAS) NMR spectra of the composites wherein each $R_1$, $R_2$, and $R_3$ are a hydrogen, the weight percentage of the carbon nanotubes relative to the total weight of the composite is 0.1%, and n is 6 (CMA-1), 8 (CMA-2), 10 (CMA-3), and 12 (CMA-4).

FIG. 5 is an overlay of solid-state 13C-NMR CPMAS spectra of the synthesized polymer/CNT composites. A peak at ~165 ppm was observed in all the spectra, which was attributed to the imine bond (a) of the melamine moiety. A peak at ~70 ppm was attributed to the methylene carbon (b) between the amine of melamine and alkyldiamine. A peak at ~50 ppm was attributed to the methylene carbon next to the amine group of alkyldiamine (c). The rest of the methylene carbons on the aliphatic chain of alkyldiamine (d) were assigned to the peak at ~30 ppm, which increases in intensity as the aliphatic chain increases [Rego R, 36 507938US Adriaensens P J, Carleer R A, Gelan J M. Fully quantitative carbon-13 NMR characterization of resol phenol-formaldehyde prepolymer resins. Polymer. 2004; 45: 33-38; and Lenghaus K, Qiao G G, Solomon D H. The effect of formaldehyde to phenol ratio on the curing and carbonisation behaviour of resole resins. Polymer. 2001; 42: 3355-3362].

Figure 6:
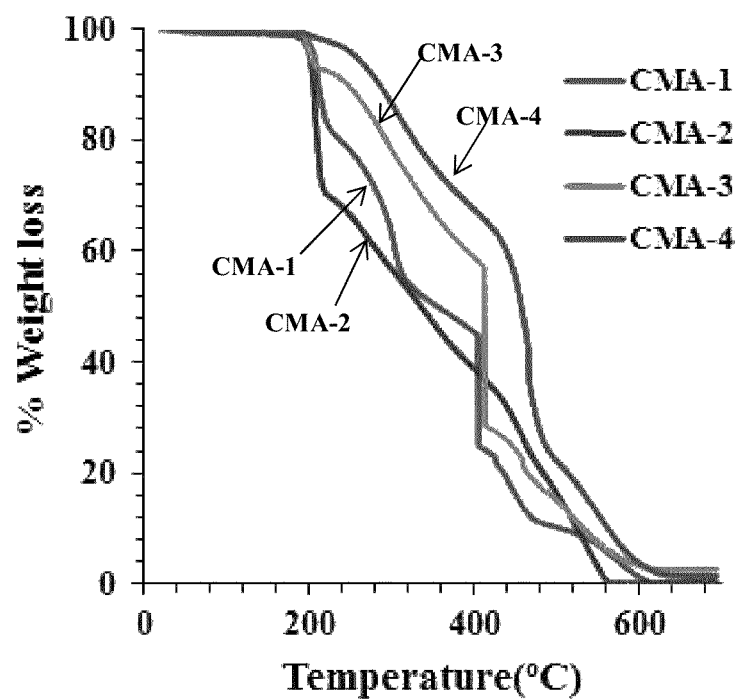
FIG. 6 is an overlay of thermogravimetric analysis (TGA) of the composites wherein each $R_1$, $R_2$, and $R_3$ are a hydrogen, the weight percentage of the carbon nanotubes relative to the total weight of the composite is 0.1%, and n is 6 (CMA-1), 8 (CMA-2), 10 (CMA-3), and 12 (CMA-4).

FIG. 6 shows the thermogravimetric analysis of the synthesized polyamine/CNT composites in air. The thermograms reveal that the polymer composites are stable at temperature up to ~220° C. after which a steep % weight loss was observed as the polymers began to decompose by releasing $NO_x$ and $CO_2$ gases [Blackwell J, Nagarajan M R, Hoitink T B. Structure of polyurethane elastomers: effect of chain extender length on the structure of MDI/diol hard segments. Polymer. 1982; 23:950-956].

Figure 7:
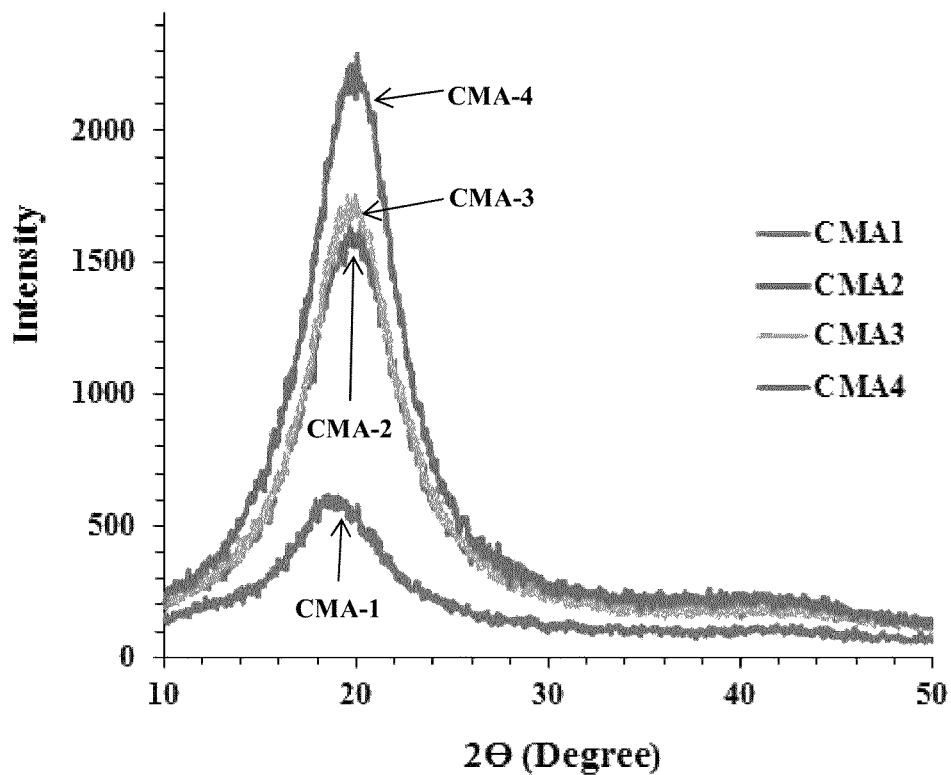
FIG. 7 is an overlay of X-ray diffraction (XRD) patterns of the composites wherein each $R_1$, $R_2$, and $R_3$ are a hydrogen, the weight percentage of the carbon nanotubes relative to the total weight of the composite is 0.1%, and n is 6 (CMA-1), 8 (CMA-2), 10 (CMA-3), and 12 (CMA-4).

FIG. 7 represents powder X-ray diffraction (XRD) patterns of the synthesized polyamine composites. A distinct peak at a 2Θ approximately 19° was observed for all composites. It is found that the crystallinity increases as the alkyl chain length increases from 1,6-diaminohexane to 1,12-diaminododecane, since a longer chains bearing more methylene groups provides more compactness and better packing [Al Hamouz O. Synthesis and Characterization of a Novel Series of Cross-Linked (Phenol, Formaldehyde, Alkyldiamine) Terpolymers for the Removal of Toxic Metal Ions from Wastewater. Arab J Sci Eng. 2015:1-15].

Example 6

Adsorption Studies

Adsorption experiments were performed in two stages. The first stage included testing the efficiency of the polymer composites toward cadmium removal from model solutions to select the most efficient polymer composite. The second stage was to further investigate the most efficient polymer composite under various adsorption conditions (pH, initial concentration, time, and temperature). A 0.03 g polymer composite sample and 20 mL metal ion solution at a specified condition were stirred for a specific time under controlled conditions (pH, initial concentration and temperature). At the end of the experiment, a difference in the concentration of cadmium ions as a result of adsorption was analyzed by ICP-MS [Al Hamouz O C S, Ali S A. Novel cross-linked polyphosphonate for the removal of $Pb^{2+}$ and $Cu^{2+}$ from aqueous solution. Ind Eng Chem Res. 2012; 51(43):14178-14187]. The adsorption capacity of the polymer toward metal ions ($q_e$) in mg g$^{-1}$ can be determined by Equation 1:

$$q_e = \frac{(C_o - C_f)V}{W} \qquad (1)$$

where initial ($C_o$) and final ($C_f$) concentrations of cadmium (II) ions are in mg L$^{-1}$, respectively, W is the weight of the dried cross-linked polymer in g, and V is the volume of solution in L.

Example 7

Figure 8A:
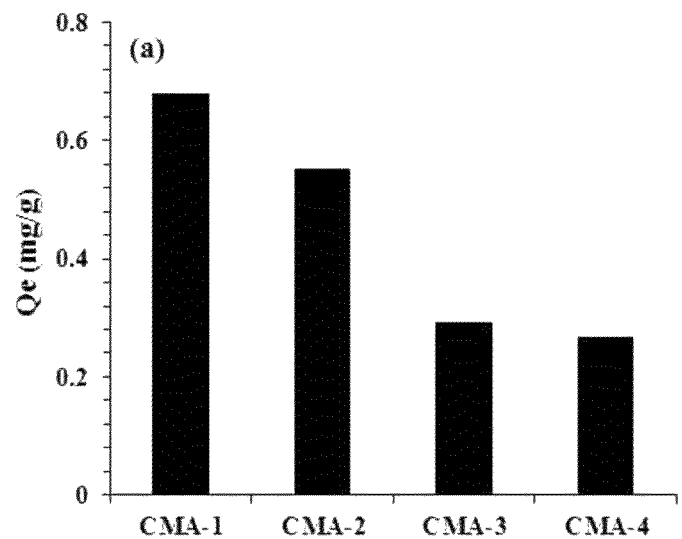
FIG. 8A is a bar graph illustrating the relationship between alkyl chain length n of the composite wherein each $R_1$, $R_2$, and $R_3$ are a hydrogen, the weight percentage of the carbon nanotubes relative to the total weight of the composite is 0.1% and cadmium ion adsorption capacity.

Adsorption Properties: Effect of Chain Length and pH on the Removal of Cadmium Ions FIG. 8A depicts the effect of alkyldiamine aliphatic moiety on the adsorption capacity. It was concluded that increasing the length of aliphatic chain of the polymer caused a reduction in the adsorption capacity. This could be explained by the stronger repulsion effect due to an increase in the hydrophobic content of the cross-linked polymer as the chain length of the alkyldiamine moiety increases. The results show that the most efficient polyamine composite is CMA1. As a result, further studies on the adsorption properties were conducted on CMA1.

Figure 8B:
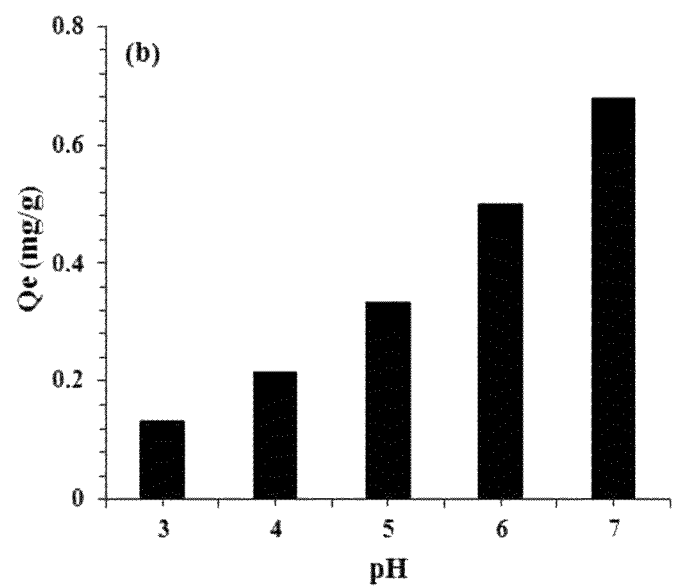
FIG. 8B is a bar graph illustrating the effect of pH of an aqueous solution on cadmium ion adsorption capacity of the composite wherein each $R_1$, $R_2$, and $R_3$ are a hydrogen, the weight percentage of the carbon nanotubes relative to the total weight of the composite is 0.1%, and n is 6 (CMA-1).

FIG. 8B shows the effect of pH on the adsorption capacity of CMA1. Increasing the pH of the solution from acidic towards neutral (pH=7) enhanced the adsorption potential of the polymer composite. At lower pH values, there is a high prevalence of hydrogen ions ($H^+$) in the acidic solution which would compete with cadmium ions for the active sites on the polymer composites, thereby reducing the availability of active adsorption sites for cadmium ion sorption. In addition, as the pH value goes beyond 7, cadmium ions may precipitate by forming metal hydroxides through metal speciation [Yadanaparthi S K R, Graybill D, von W andruszka R. Adsorbents for the removal of arsenic, cadmium, and lead from contaminated waters. J Hazard Mater. 2009; 171(1-3):1-15].

Example 8

Figure 9A:
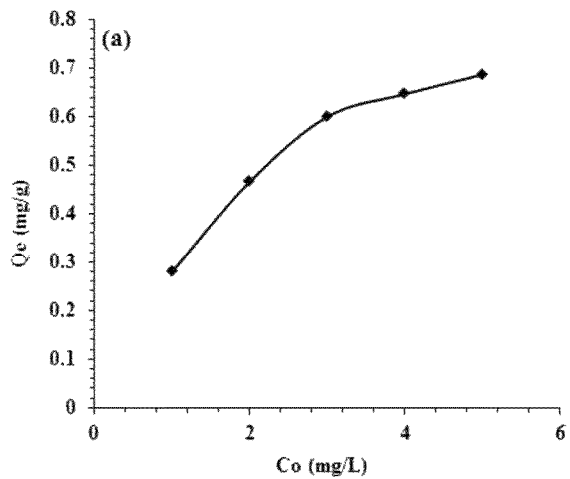
FIG. 9A is a plot illustrating the relationship between initial concentration of cadmium ions and cadmium ion adsorption capacity of the composite wherein each $R_1$, $R_2$, and $R_3$ are a hydrogen, the weight percentage of the carbon nanotubes relative to the total weight of the composite is 0.1%, and n is 6 (CMA-1).
Figure 9B:
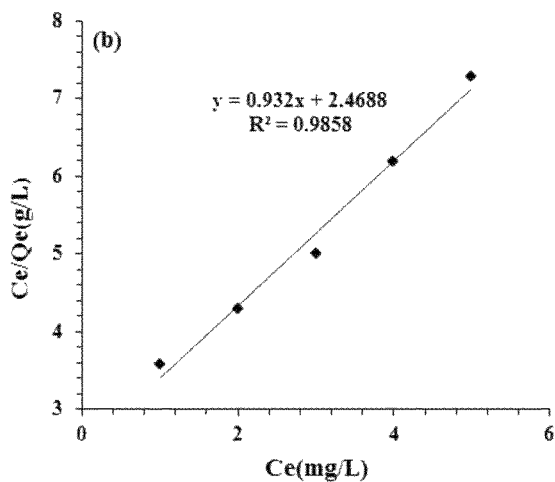
FIG. 9B is a Langmuir adsorption isotherm for cadmium ion adsorption by the composite wherein each $R_1$, $R_2$, and $R_3$ are a hydrogen, the weight percentage of the carbon nanotubes relative to the total weight of the composite is 0.1%, and n is 6 (CMA-1).

Adsorption Properties: Effect of Cadmium Ion Initial Concentration on the Adsorption Isotherms The initial concentration effect was studied at pH=7. The concentration of cadmium (II) ions solutions were ranged from 1 mg/L to 5 mg/L. FIG. 9A shows the effect of initial concentration on the adsorption capacity. From the figure it could be concluded that there is an increase in the adsorption potential of the adsorbent as the initial concentration increases. To further investigate the mechanism of the adsorption process, Freundlich and Langmuir isotherm models were used. Langmuir isotherm model describes the nature of adsorption on a homogeneous surface in a single layer form. Each active site can be effectively occupied by an individual metal ion and is independent from other adsorbed metal ions [Júnior O K, Gurgel L V A, de Freitas R P, Gil L F. Adsorption of Cu(II), Cd(II), and Pb(II) from aqueous single metal solutions by mercerized cellulose and mercerized sugarcane bagasse chemically modified with EDTA dianhydride (EDTAD). Carbohydrate Polymers. 2009; 77(3):643-650]. As shown in FIG. 9B, the adsorption data obtained fit well using the linear form of Languir model, which is expressed as:

$$\frac{C_e}{q_e} = \frac{C_e}{Q_m} + \frac{1}{bQ_m} \qquad (2)$$

where $C_e$ and $q_e$ represent the concentration of the metal ions (mg/L) and the adsorption capacity at equilibrium, respectively, b represents the Langmuir constant which is related to the adsorption energy (L/mg) and Qm is the maximum adsorption capacity measured in mg/g. The regression value ($R^2$=0.9858) of the Langmuir model shows a good fit to the model assuming that the adsorption process is homogeneous in nature (Table 2) [Boudrahem F, Aissani-Benissad F, Soualah A. Kinetic and Equilibrium Study of the Sorption of Lead(II) Ions from Aqueous Phase by Activated Carbon. Arab J Sci Eng. 2013; 38(8):1939-1949; and Azarudeen R S, Subha R, Jeyakumar D, Burkanudeen A R. Batch separation studies for the removal of heavy metal ions using a chelating terpolymer: Synthesis, characterization and isotherm models. Sep Purif Technol. 2013; 116:366-377].

Figure 9C:
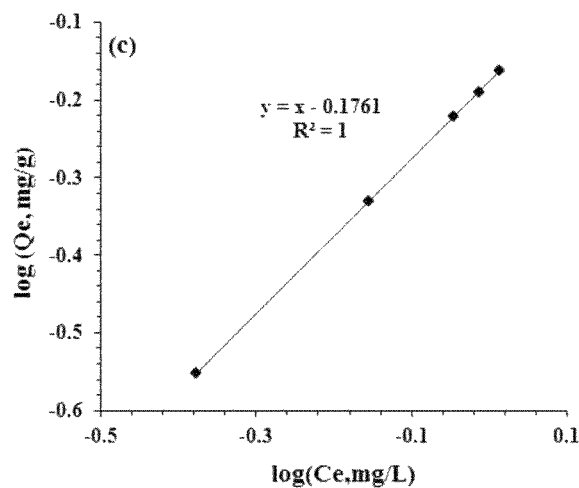
FIG. 9C is a Freundlich adsorption isotherm for cadmium ion adsorption by the composite wherein each $R_1$, $R_2$, and $R_3$ are a hydrogen, the weight percentage of the carbon nanotubes relative to the total weight of the composite is 0.1%, and n is 6 (CMA-1).

On the other hand, Freundlich isotherm model was used to investigate the process of adsorption that occurs on a heterogeneous surface of an adsorbent (FIG. 8c) [Yao S, Liu Z, Shi Z. Arsenic removal from aqueous solutions by adsorption onto iron oxide/activated carbon magnetic composite. J Environ Health Sci Eng. 2014; 12(1):58]. The freundlich isotherm model can be expressed in its linear form as:

$$\log q_e = \log k_F + \frac{1}{n} \log C_e \quad (3)$$

where 1/n and $k_f$ are constants representing the intensity of adsorption and adsorption capacity, respectively. As illustrated in FIG. 9C, the linear plot shows that the data obtained fit the Freundlich isotherm model with a regression value of unity, providing a clear indication that the adsorption follows a heterogeneous nature.

TABLE 2

Langmuir and Freundlich isotherm models for the adsorption of cadmium ions by CMA1 composite.

| Polymer Composite | Metal ion | Langmuir Isotherm model | | |
|---|---|---|---|---|
| | | $Q_m$ (mg g$^{-1}$) | b (L mg$^{-1}$) | $R^2$ |
| CMA1 | Cd$^{2+}$ | 1.0729 | 0.37751 | 0.9858 |

| | Freundlich Isotherm model | | |
|---|---|---|---|
| | $k_f$ (mg$^{1-1/n}$ g$^{-1}$L$^{1/n}$) | n | $R^2$ |
| | 0.6666 | 1.000 | 1.000 |

Example 9

Adsorption Properties: Effect of Time and Kinetic Models

Figure 10A:
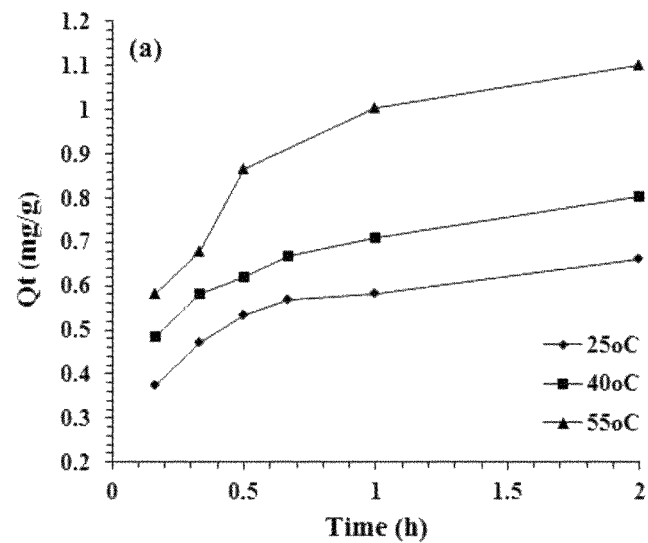
FIG. 10A is a plot illustrating the relationship between contact time and cadmium ion adsorption capacity of the composite wherein each $R_1$, $R_2$, and $R_3$ are a hydrogen, the weight percentage of the carbon nanotubes relative to the total weight of the composite is 0.1%, and n is 6 (CMA-1).
Figure 10B:
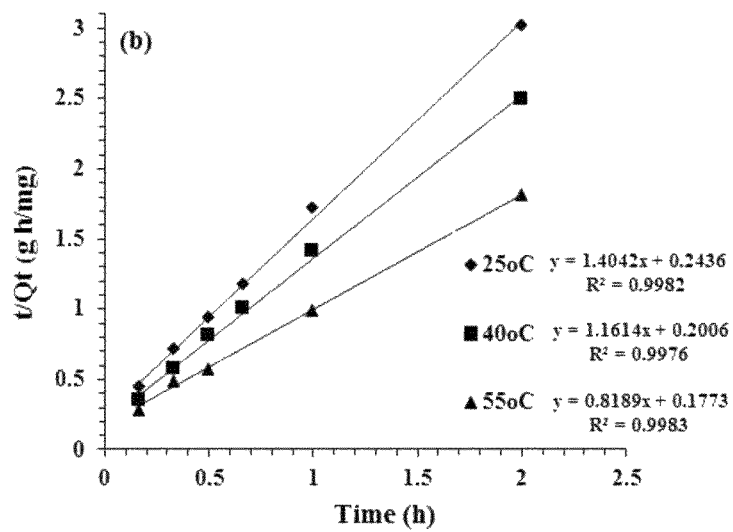
FIG. 10B is an overlay of pseudo second-order kinetic model plots for cadmium ion adsorption by the composite wherein each $R_1$, $R_2$, and $R_3$ are a hydrogen, the weight percentage of the carbon nanotubes relative to the total weight of the composite is 0.1%, and n is 6 (CMA-1) at temperatures of 25° C., 40° C., and 55° C.

FIG. 10A represents the effect of time on the adsorption capacity of CMA1. The figure shows an enhancement in the adsorption capacity of CMA1 as time increases. The adsorption of CMA1 reaches equilibrium within 1-2 hours, which indicates a high efficiency in the removal of cadmium ions. The availability of increased active sites can be credited to the presence of carbon nanotubes known for their high surface area. The Pseudo second-order kinetic model was utilized for investigating the chemisorption pattern of cadmium ions by CMA1 at different temperatures from model aqueous solutions (FIG. 10B) [Shaaban A F, Fadel D A, Mahmoud A A, Elkomy M A, Elbahy S M. Synthesis of a new chelating resin bearing amidoxime group for adsorption of Cu(II), Ni(II) and Pb(II) by batch and fixed-bed column methods. J Environ Chem Eng. 2014; 2:632-641; and Tran L, Wu P, Zhu Y, Yang L, Zhu N. Highly enhanced adsorption for the removal of Hg(II) from aqueous solution by Mercaptoethylamine/Mercaptopropyltrimethoxysilane functionalized vermiculites. Journal of Colloid and Interface Science. 2015; 445(0):348-356]. The linear form of the model is expressed by equation 4:

$$\frac{t}{q_t} = \frac{1}{k_2 q_e^2} + \frac{t}{q_e} \quad (4)$$

where $k_2$ and $q_t$ are the pseudo second order rate constant (g mg$^{-1}$ h$^{-1}$) and adsorption capacity at time t, respectively which are both extrapolated from the slope and intercept of the graph in FIG. 10B. The calculated adsorption capacity ($q_e$) matches the experimentally observed value and the fitness of the data to the pseudo second-order kinetic model as shown in Table 3 indicate that the adsorption of cadmium ions to the polymer composites could be a chemisorption in nature [Al Hamouz O C S, Amayreh M Y. Removal of lead(II) and nickel(II) ions from aqueous solution via Bermuda grass biomass. Journal of Water Supply: Research and Technology—Aqua. 2016; 65(6):494-503]. FIG. 10B further depicts that the adsorption capacity increases as the temperature increases, assuming that the adsorption process is endothermic in nature.

TABLE 3

Pseudo second-order kinetic model thermodynamics constant.

| Temperature (K) | Pseudo second order model | | | | |
|---|---|---|---|---|---|
| | $q_{e,obv}$ (mg g$^{-1}$) | $q_{e,cal}$ (mg g$^{-1}$) | $k_2$ (g mg$^{-1}$ h$^{-1}$) | h (mg$^{-1}$ g$^{-1}$ h$^{-1}$) | $R^2$ |
| 298 | 0.7000 | 0.7122 | 8.0932 | 4.1051 | 0.9982 |
| 313 | 0.8300 | 0.8610 | 6.7245 | 4.9850 | 0.9976 |
| 328 | 1.1800 | 1.2216 | 3.7794 | 5.6400 | 0.9983 |

Example 10

Figure 11A:
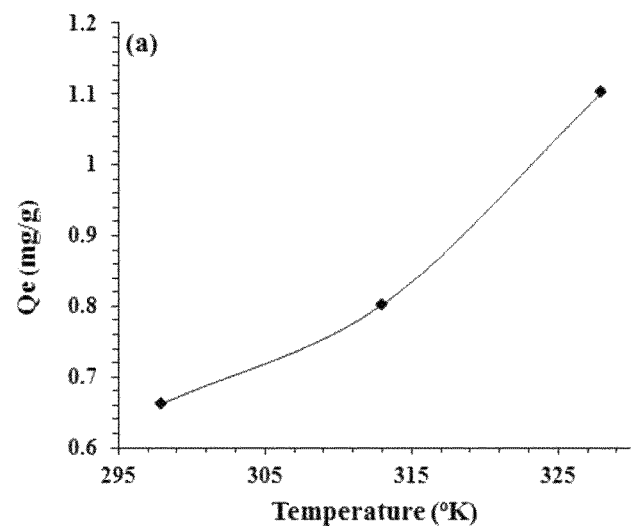
FIG. 11A is a plot illustrating the effect of temperature on cadmium ion adsorption capacity of the composite wherein each $R_1$, $R_2$, and $R_3$ are a hydrogen, the weight percentage of the carbon nanotubes relative to the total weight of the composite is 0.1%, and n is 6 (CMA-1).
Figure 11B:
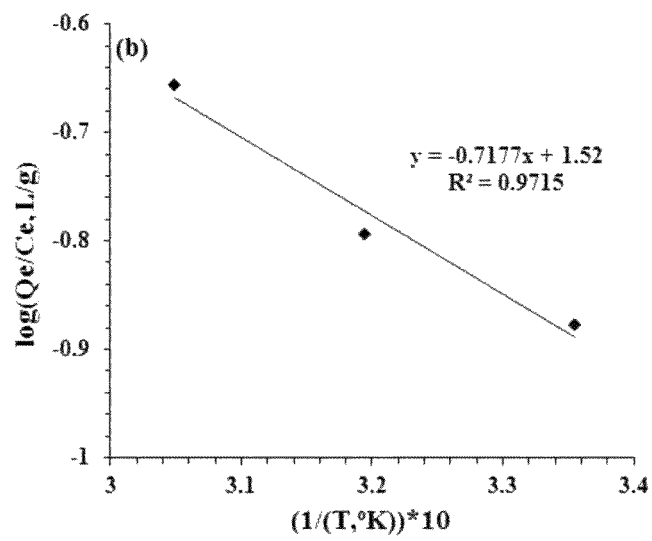
FIG. 11B is a Van't-Hoff plot for calculating thermodynamic parameters of cadmium ion adsorption by the composite wherein each $R_1$, $R_2$, and $R_3$ are a hydrogen, the weight percentage of the carbon nanotubes relative to the total weight of the composite is 0.1%, and n is 6 (CMA-1).

Adsorption Properties: Effect of Temperature and Thermodynamic Properties of the Adsorption Process Adsorption experiments were performed at different temperatures to investigate the effect of temperature on the adsorption of cadmium ions by CMA1 (FIG. 11A). As shown in FIG. 11A, the adsorption capacity increases as the temperature increases, which could be resulted from the expansion of the pores in polymer composites that allows more cadmium ions to diffuse and be adsorbed. The experimental data were analyzed in order to calculate the thermodynamic parameters (ΔG, ΔH, ΔS) by the linear expression of the Van't-Hoff equation 5:

$$\log\left(\frac{q_e}{C_e}\right) = -\frac{\Delta H}{2.303 RT} + \frac{\Delta S}{2.303 R} \quad (5)$$

The negative ΔG values presented in Table 4 show that the adsorption process is spontaneous in nature and the adsorption process is favorable. Also, positive ΔH values indicate that the adsorption process is endothermic in nature. The positive ΔS values show an increase in randomness which could be explained by a loss of hydration water molecules as cadmium ions being adsorbed [Coskun R, Soykan C, Saçak M. Removal of some heavy metal ions from aqueous solution by adsorption using poly(ethylene terephthalate)-g-itaconic acid/acrylamide fiber. Reactive and Functional Polymers. 2006; 66(6):599-608].

TABLE 4

Thermodynamic data for the adsorption of cadmium ions by CMA1.

| Metal ion | Temperature (K) | $\Delta G$ (kJ/mol) | $\Delta H$ (kJ/mol) | $\Delta S$ (J/mol) | $R^2$ |
|---|---|---|---|---|---|
| $Cd^{2+}$ | 298 | −5.069 | 13.7419 | 29.1036 | 0.9715 |
|  | 313 | −4.632 |  |  |  |
|  | 328 | −4.195 |  |  |  |

Example 11

SEM-EDX Images of CMA1 Polymer/CNT Composite

Figure 12A:
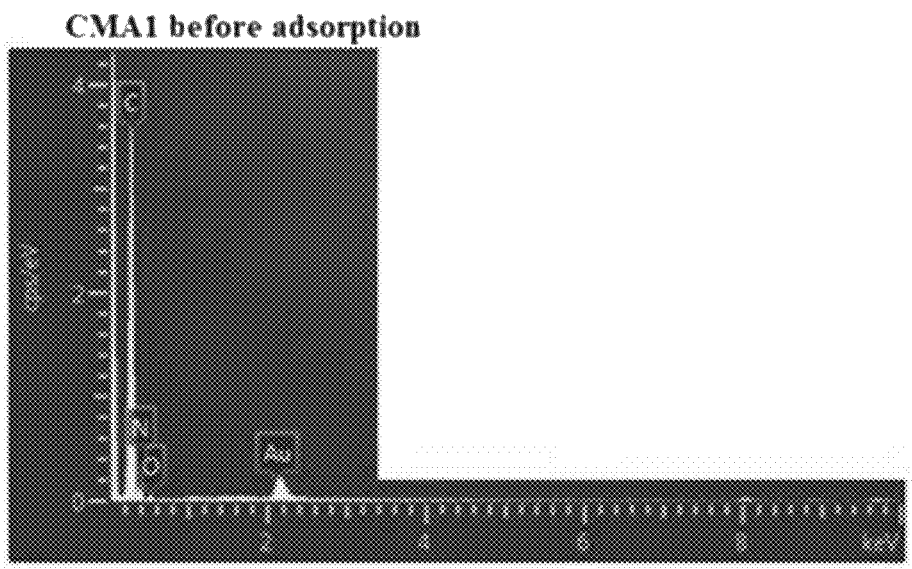
FIG. 12A is a scanning electron microscopy-energy dispersive X-ray spectroscopy (SEM-EDX) elemental analysis of the composite wherein each $R_1$, $R_2$, and $R_3$ are a hydrogen, the weight percentage of the carbon nanotubes relative to the total weight of the composite is 0.1%, and n is 6 (CMA-1).
Figure 12B:
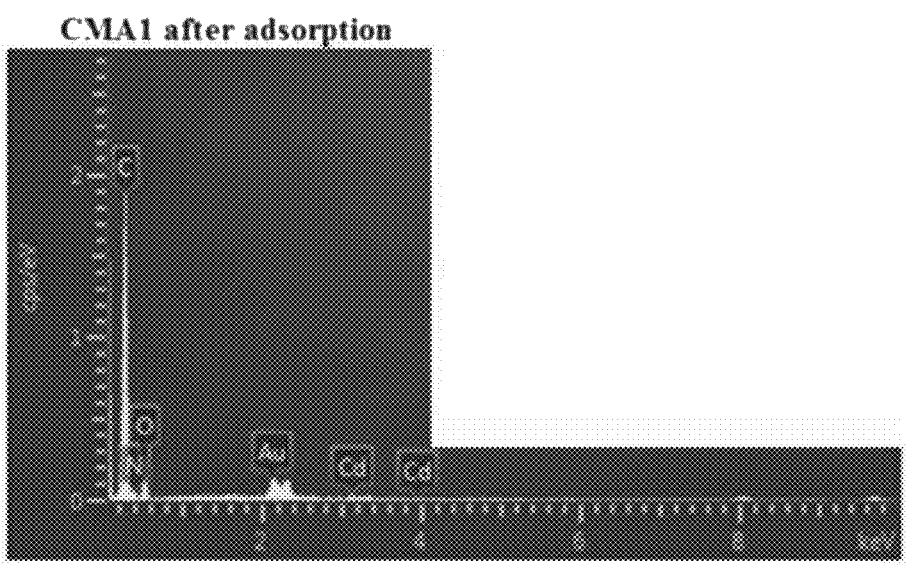
FIG. 12B is a SEM-EDX elemental analysis of the composite wherein each $R_1$, $R_2$, and $R_3$ are a hydrogen, the weight percentage of the carbon nanotubes relative to the total weight of the composite is 0.1%, and n is 6 (CMA-1) after loading with cadmium ion.
Figure 13A:
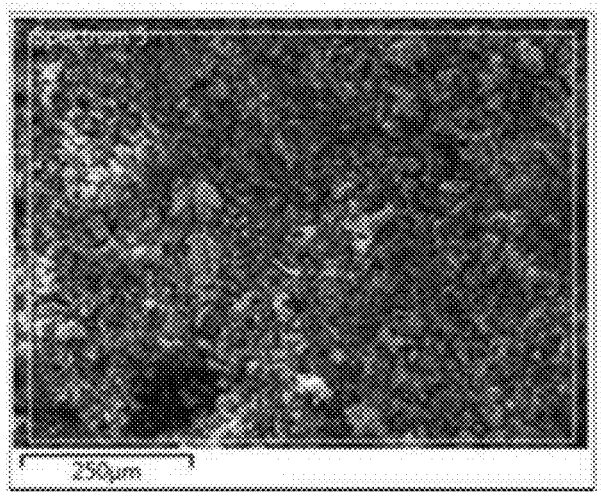
FIG. 13A is a SEM-EDX micrograph image of the composite wherein each $R_1$, $R_2$, and $R_3$ are a hydrogen, the weight percentage of the carbon nanotubes relative to the total weight of the composite is 0.1%, and n is 6 (CMA-1).
Figure 13B:
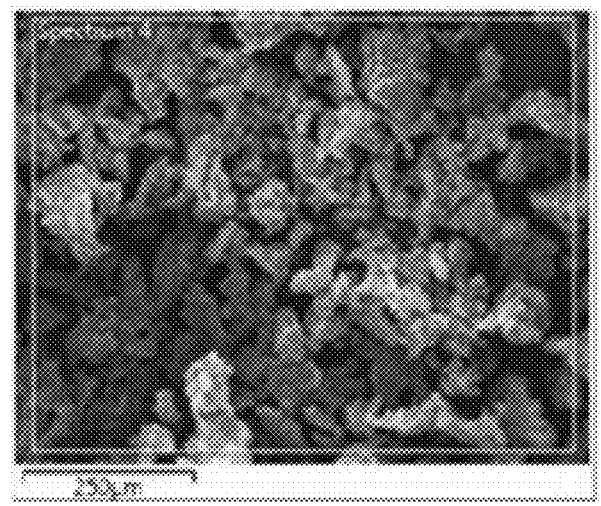
FIG. 13B is a SEM-EDX micrograph image of the composite wherein each $R_1$, $R_2$, and $R_3$ are a hydrogen, the weight percentage of the carbon nanotubes relative to the total weight of the composite is 0.1%, and n is 6 (CMA-1) after loading with cadmium ion.

The polymer composite CMA1 was characterized by SEM-EDX as shown in FIGS. 12A-B and 13 A-B. The polymer composite was sputter coated with a gold film of 5 nm thickness. The coated polymer composite was analyzed before and after adsorption with cadmium ions. Morphology of the composite in powder form shown in FIGS. 13A and 13B indicate an increase in particle size upon adsorption with cadmium ions, which could be attributed to cadmium ions loading as depicted by the EDX analysis (FIGS. 12A and 12B).

The invention claimed is:

1. A method for removing cadmium ions from an aqueous solution, comprising:
    contacting the aqueous solution having an initial concentration of the cadmium ions with a composite to form a mixture; and
    filtering the mixture to obtain an aqueous solution having a reduced concentration of the cadmium ions compared to the initial concentration and a cadmium ion loaded composite;
    wherein the composite is a poly condensation product formed by a reaction of:
    melamine;
    an aldehyde of formula (I)

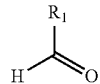

(I)

or a salt, solvate, or stereoisomer thereof;
    a diaminoalkane of formula (II)

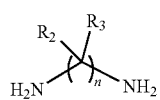

(II)

or a salt, solvate, tautomer or stereoisomer thereof; and
    carbon nanotubes comprising activated carbonyl groups;
wherein:
    $R_1$ is selected from the group consisting of a hydrogen, an optionally substituted alkyl, an optionally substituted cycloalkyl, and an optionally substituted aryl;
    $R_2$ is selected from the group consisting of a hydrogen, an optionally substituted alkyl, an optionally substituted cycloalkyl, an optionally substituted aryl, and an optionally substituted arylalkyl;
    $R_3$ is selected from the group consisting of a hydrogen, an optionally substituted alkyl, an optionally substituted cycloalkyl, an optionally substituted aryl, and an optionally substituted arylalkyl;
    n is a positive integer in the range of 4-16; and
    a weight percentage of the carbon nanotubes relative to a total weight of the composite is 0.6 wt % to 1.0 wt %.

2. The method of claim 1, wherein a molar ratio of the diaminoalkane of formula (II) to melamine is in the range of 1:1 to 5:1.

3. The method of claim 1, wherein a molar ratio of the aldehyde of formula (I) to melamine is in the range of 2:1 to 10:1.

4. The method of claim 1, wherein the activated carbonyl group is an acyl halide group.

5. The method of claim 1, wherein the carbon nanotubes are multi-walled carbon nanotubes.

6. The method of claim 1,
    wherein, each $R_1$, $R_2$, and $R_3$ are a hydrogen; and
    n is a positive integer in the range of 6-12.

7. The method of claim 6, wherein n is 6.

8. The method of claim 1, wherein the composite has a particle size of 10-100 μm.

9. A method for removing cadmium ions from an aqueous solution, comprising:
    contacting the aqueous solution having an initial concentration of the cadmium ions with a composite to form a mixture; and
    filtering the mixture to obtain an aqueous solution having a reduced concentration of the cadmium ions compared to the initial concentration and a cadmium ion loaded composite;
    wherein the composite is a poly condensation product formed by a reaction of:
    melamine;
    an aldehyde of formula (I)

(I)

or a salt, solvate, or stereoisomer thereof:
    a diaminoalkane of formula (II)

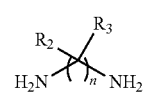

(II)

or a salt, solvate, tautomer or stereoisomer thereof: and
    carbon nanotubes comprising activated carbonyl groups;
    wherein:
    each $R_1$, $R_2$, and $R_3$ are a hydrogen;
    n is 6;
    the composite has a particle size of 10-100 μm;
    the activated carbonyl group is an acyl halide group;

a weight percentage of the carbon nanotubes relative to a total weight of the composite is 0.6 to 1.0 wt. %; and the composite has a cadmium ion adsorption capacity in the range of 1000-1,500 µg per g of the composite.

10. The method of claim 1, wherein the aqueous solution has a pH in the range of 2 to 7.

11. The method of claim 1, wherein the initial concentration of the cadmium ions in the aqueous solution ranges from 0.1 mg $L^{-1}$ to 100 mg $L^{-1}$.

12. The method of claim 1, wherein the composite is present at a concentration in the range of 0.1-10 g per liter of the aqueous solution during the contacting.

13. The method of claim 1, wherein the composite is contacted with the aqueous solution for 0.1-4 hours.

14. The method of claim 1, wherein the composite is contacted with the aqueous solution at a temperature in the range of 15° C. to 80° C.

15. The method of claim 1, wherein greater than 25% of a total mass of the cadmium ions is removed from the aqueous solution.

16. The method of claim 1, wherein the cadmium ion loaded composite comprises one or more cadmium ions coordinated to one or more nitrogen atoms.

17. The method of claim 1, wherein the cadmium ion loaded composite comprises one or more cadmium ions adsorbed onto the carbon nanotubes.

18. The method of claim 1, wherein the cadmium ion loaded composite has a particle size of 12-150 µm.

19. The method of claim 1, wherein each $R_1$, $R_2$, and $R_3$ are a hydrogen and n is 6;

wherein the composite is contacted with the aqueous solution at a temperature in the range of 45° C. to 65° C. for 1.5-2.5 hours; and wherein the composite has a cadmium ion adsorption capacity of greater than 1000 µg per g of the composite.

20. The method of claim 1, wherein n is in the range of 12-16.

* * * * *